United States Patent
Buckenmaier et al.

(10) Patent No.: US 12,055,526 B2
(45) Date of Patent: Aug. 6, 2024

(54) SAMPLE HANDLING AND DISPATCHING INDIVIDUAL SAMPLE PACKAGES FOR FLUID PROCESSING

(71) Applicant: Agilent Technologies, Inc., Santa Clara, CA (US)

(72) Inventors: Stephan Buckenmaier, Ettlingen (DE); Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 122 days.

(21) Appl. No.: 17/045,756

(22) PCT Filed: Apr. 5, 2019

(86) PCT No.: PCT/IB2019/052808
§ 371 (c)(1),
(2) Date: Oct. 6, 2020

(87) PCT Pub. No.: WO2019/193558
PCT Pub. Date: Oct. 10, 2019

(65) Prior Publication Data
US 2021/0055268 A1    Feb. 25, 2021

(30) Foreign Application Priority Data
Apr. 6, 2018  (DE) ...................... 10 2018 108 218.5

(51) Int. Cl.
*G01N 30/20* (2006.01)
*G01N 30/02* (2006.01)
(Continued)

(52) U.S. Cl.
CPC .......... *G01N 30/20* (2013.01); *G01N 30/463* (2013.01); *G01N 30/465* (2013.01); *G01N 30/82* (2013.01);
(Continued)

(58) Field of Classification Search
CPC ......... B01D 15/1878; G01N 2030/027; G01N 2030/202; G01N 2030/208;
(Continued)

(56) References Cited

U.S. PATENT DOCUMENTS

| 4,982,597 A | 1/1991 | Berger |
|---|---|---|
| 6,012,487 A | 1/2000 | Hauck |

(Continued)

FOREIGN PATENT DOCUMENTS

| CN | 102612648 A | 7/2012 |
|---|---|---|
| CN | 203178243 U | 9/2013 |

(Continued)

OTHER PUBLICATIONS

Anonymous, "Simultaneous Injection of the Same Sample onto Separate Columns", (Jul. 1, 2014), p. 1, URL: https://web.archive.org/web/20140701183827/https://www.vici.com/support/app/app14.php, (Jul. 1, 2019), XP055600951.

(Continued)

*Primary Examiner* — David L Singer

(57) ABSTRACT

A sampling unit for handling a sample fluid includes a sample container having a length and being configured for receiving and storing the sample fluid, and a sample segment dispatching unit configured for providing a plurality of individual sample packages of the fluidic sample, each contained in a respective volume segment along the length of the sample container, and for individually dispatching each of the plurality of individual sample packages for further processing in a fluid processing unit. The sample unit may be utilized, for example, for injecting the sample packages into a mobile phase stream for transporting to a sample separating unit such as a chromatography column.

18 Claims, 8 Drawing Sheets

(51) Int. Cl.
*G01N 30/46* (2006.01)
*G01N 30/82* (2006.01)
*G01N 30/84* (2006.01)
*B01D 15/18* (2006.01)

(52) U.S. Cl.
CPC .... *B01D 15/1878* (2013.01); *G01N 2030/027* (2013.01); *G01N 2030/202* (2013.01); *G01N 2030/208* (2013.01); *G01N 2030/8411* (2013.01)

(58) Field of Classification Search
CPC ........... G01N 2030/8411; G01N 30/20; G01N 30/463; G01N 30/465; G01N 30/82
See application file for complete search history.

(56) References Cited

U.S. PATENT DOCUMENTS

| | | | | |
|---|---|---|---|---|
| 2012/0096919 | A1* | 4/2012 | Choikhet | G01N 30/24 73/1.02 |
| 2012/0132013 | A1* | 5/2012 | Glatz | G01N 30/20 73/863.02 |
| 2012/0145617 | A1* | 6/2012 | Lee | B01D 15/16 251/356 |
| 2013/0008859 | A1* | 1/2013 | Witt | G01N 30/02 204/600 |
| 2013/0067997 | A1* | 3/2013 | Ebsen | G01N 30/20 73/61.55 |
| 2013/0134095 | A1* | 5/2013 | Anderer | B01D 15/08 210/656 |
| 2014/0366739 | A1 | 12/2014 | Witt et al. | |
| 2015/0204828 | A1* | 7/2015 | Witt | G01N 30/06 204/601 |
| 2016/0334031 | A1* | 11/2016 | Shoykhet | F16K 99/0028 |
| 2017/0219540 | A1 | 8/2017 | Anderer et al. | |

FOREIGN PATENT DOCUMENTS

| | | | |
|---|---|---|---|
| CN | 104395748 B | 9/2017 | |
| CN | 107449851 A | 12/2017 | |
| CN | 107449852 A | 12/2017 | |
| DE | 102013114921 A1 * | 5/2014 | ............ G01N 30/20 |
| EP | 1577012 A1 | 9/2005 | |
| EP | 3032253 A1 | 6/2016 | |
| EP | 3252464 A1 | 12/2017 | |
| WO | WO-2012175111 A1 * | 12/2012 | ............ G01N 30/32 |
| WO | 2014000778 A1 | 1/2014 | |
| WO | 2014085003 A2 | 6/2014 | |

OTHER PUBLICATIONS

International Search Report and Written Opinion dated Jul. 15, 2019; Application No. PCT/IB2019/052808; 18 pages.

Tanaka et al., "A high accuracy method for determining nitrogen, argon and oxygen in seawater", Marine Chemistry, Elsevier Science B.V., Amsterdam, NL, (Aug. 1, 2007), vol. 106, No. 3-4, doi:10.1016/J.MARCHEM.2007.05.005, ISSN 0304-4203, pp. 516-529, XP022202558.

Siegle et al., "Development of a Straightforward and Robust Technique to Implement Hadamard Encoded Multiplexing to High-Performance Liquid Chromatography," Anal. Chem. 2014, 86,10828-10833.

Zawatzky et al., "Using chromatogram averaging to improve quantitation of minor impurities," Journal of Chromatography A, 1465 (2016) 205-210.

* cited by examiner

| 27 | degasser |
| 30 | separating device |
| 50 | detector |
| 60 | fractionating unit |
| 70 | control unit |
| 90 | sampling unit |

SAMPLE HANDLING AND DISPATCHING INDIVIDUAL SAMPLE PACKAGES FOR FLUID PROCESSING

RELATED APPLICATIONS

This application is the national stage under 35 U.S.C. 371 of International Application No. PCT/IB2019/052808, filed Apr. 5, 2019, which claims priority to German Application No. DE 10 2018 108 218.5, filed Apr. 6, 2018, the entire contents of both of which are incorporated by reference herein.

BACKGROUND ART

The present invention relates to handling a sample fluid, in particular in a high-performance liquid chromatography application.

In high performance liquid chromatography (HPLC), a liquid has to be provided usually at a very controlled flow rate (e. g. in the range of microliters to milliliters per minute) and at high pressure (typically 20-100 MPa, 200-1000 bar, and beyond up to currently 200 MPa, 2000 bar) at which compressibility of the liquid becomes noticeable. For liquid separation in an HPLC system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be generated, and from the chromatogram the compounds may be identified. For each compound, the chromatogram displays a separate curve feature also designated as a "peak". Efficient separation of the compounds by the column is advantageous because it provides for measurements yielding well defined peaks having sharp maxima inflection points and narrow base widths, allowing excellent resolution and reliable identification and quantitation of the mixture constituents. Broad peaks, caused by poor column performance, so called "Internal Band Broadening" or poor system performance, so called "External Band Broadening" are undesirable as they may allow minor components of the mixture to be masked by major components and go unidentified.

An HPLC column typically comprises a stainless steel tube having a bore containing a packing medium comprising, for example, silane derivatized silica spheres having a diameter between 0.5 to 50 µm, or 1-10 µm or even 1-7 µm. The medium is packed under pressure in a highly uniform manner, which ensures a uniform flow of the transport liquid and the sample through the column to promote effective separation of the sample constituents. Columns can be sensitive to flow disruptions and e.g. to reconnections with sample loops which hold lower pressure than the column itself (flow reversal due to backwards de-compression of the column content). Also the column may be sensitive to abrupt (re)connection to high pressure sources, resulting in pressure shocks on the column and packing material deterioration. These can be substantial factors of column aging, wear and deterioration.

Two-dimensional separation of a fluidic sample denotes a separation technique in which a first separation procedure in a first separation unit is performed to separate a fluidic sample into a plurality of fractions, and in which a subsequent second separation procedure in a second separation unit is performed to further separate at least one of the plurality of fractions into sub-fractions. Two-dimensional liquid chromatography (2DLC) may combine two (more or less orthogonal) chromatography separation techniques, and may provide a plot of the time dependency of detection events along two orthogonal time axes. If required, more than two separation units can be combined accordingly in order to provide a multidimensional separation, with an output of a first dimension separation unit providing the input of a second dimension separation unit, an output of the second dimension separation unit providing the input of a third dimension separation unit, and so forth.

US20160334031A1 discloses a two-dimensional fluid separation system allowing to transfer fluid from the first into the second dimension without interruption of fluid flow along the flow paths in both dimensions.

US20170219540A1 discloses sample handling by processing successive fluidic sample portions provided by a sample source, such as a first dimension HPLC unit. Plural sample reception volumes, such as sample loops or trapping columns, are filled successively, i.e. one after the other, and can be later emptied for further processing, e.g. further separation in a second dimension HPLC unit.

Single stack (also referred to as "High Definition Liquid Chromatography" or "HDLC"), as a special design of 2D-LC, is a system that re-uses at least some parts of the HPLC unit. This could be pump, detector, column thermostat or the separation column. In this design, the same parts that have been used for the separation in a first dimension are then re-used to separate fluid portions thereof in a second dimension that have been stored temporarily previously. This can be repeated, i.e. aliquots of the effluent of a 2D column (which may have been used as 1D column before) may be stored and reanalyzed in a third dimension. Then the same pump as used in 1D would be used as 2D pump and eventually as 3D pump. Due to the special setup of this system, the number of dimensions is not limited.

SUMMARY

It is an object of the invention to provide an improved sample handling, in particular for HPLC applications.

According to an exemplary embodiment of the present invention, a sampling unit for handling a sample fluid comprises a sample container having a length and being configured for receiving and storing the sample fluid, and a sample segment dispatching unit configured for providing a plurality of individual sample packages of the fluidic sample, each contained in a respective volume segment along the length of the sample container, and for individually dispatching each of the plurality of individual sample packages for further processing in a fluid processing unit. This allows on one hand to receive and store the sample fluid in "one shot" but, on the other hand, dispatching individual sample packages derived thereof "one after the other".

Embodiments of the present invention may reduce and even avoid switching steps, e.g. provided by a switching valve, required for fluidically separating such sample packages, as for example in the aforementioned US20170219540A1 wherein a switching valve is used to sequentially deposit such sample packages one after the other each in a different sample loop, thus requiring multiple switching steps. Such embodiments according to the present invention may be more robust resulting from the reduction of switching steps.

Embodiments of the present invention may provide a faster string, isolation and/or dispatching of the individual sample packages. While in prior art application such as the aforementioned US20170219540A1, a number (n) of switching steps will be required when storing and/or applying n sample segments in or into n sample loops, embodiments of the present invention may require only one switching step for storing and/or applying multiple sample packages irrespective of the number of sample packages.

Embodiments of the present invention may also or in addition reduce or even avoid potential artifacts resulting from switching steps. In prior art application such as the aforementioned US20170219540A1, n switching steps will be required when applying n sample loops, each with a certain potential of causing an error or inaccuracy. In embodiments of the present invention only one switching step irrespective of the number of sample packages may be required, thus reducing the likelihood of errors or any inaccuracy to occur. Such inaccuracy may result from small variations between switching steps, which in turn may result in a jitter effect of the switching times.

Embodiments of the present invention may reduce sample loss, as the difference between the total volume of the sample fluid received and the sum of volumes of the plurality of individual stored or isolated sample packages. In prior art application such as the aforementioned US20170219540A1 such loss of sample volume may result from overfilling each sample loop, i.e. a certain amount of the sample fluid will be pushed through and finally out of the sample loop. This may be the case if is desired to ensure that such sample loop is completely filled, or accidently.

Embodiments of the present invention may reduce contamination or carryover between respective sample packages by requiring less volume and/or length in fluid conduits required to provide such respective sample packages.

In embodiments, the sample container may comprise an inlet and an outlet, and the length is between the inlet and the outlet. A composition of the sample fluid may not be homogeneous over the length of the sample container. The sample fluid may comprise a plurality of different compounds. The sample fluid may comprise a plurality of different compounds having different distributions of concentration over the length of the sample container. The sample fluid may comprise a plurality of different compounds, each compound having a respective spatial concentration distribution along the length of the sample container resulting from a previous sample processing. Such sample processing can be one of a chromatographic separation, a flow reaction, a chemical reaction, a fermentation, and a sample withdrawal from a process fluid. The sample fluid may comprise a plurality of different compounds being pre-fractionated by a previous chromatographic separation process.

In embodiments, the sampling unit further comprises a sample divider configured for dividing the sample container along its length into the plurality of the respective volume segments and for physically separating the plurality of respective volume segments, so that each respective separated volume segment contains a respective one of the plurality of individual sample packages (which may also be referred to as sample portions). Such physically separating may be provided by fluidically dividing, isolating and/or decoupling the plurality of respective volume segments. The sample segment dispatching unit is configured for individually accessing each of the plurality of respective volume segments, and for dispatching at least a portion of the respective sample package, contained in a respective volume segment accessed by the sample segment dispatching unit, for further processing in the fluid processing unit. The sample divider may thus provide the aforementioned "one-shot" physical isolation of the plurality of respective volume segment, i.e. only one switching step may be required for such physical separation.

In embodiments, the sample divider may be configured for physically isolating the plurality of respective volume segments by fluidically dividing the plurality of respective volume segments.

In embodiments, the sample divider may comprise a valve having a plurality of sample loops, e.g. either built in or attached external to the valve, wherein the valve is configured for having a first position for serially coupling the plurality of sample loops to provide the sample container, and at least one second position for decoupling and fluidically separating the plurality of sample loops from each other (e.g. to provide the aforementioned volume segments), so that at least one of the fluidically separated plurality of sample loops can be accessed individually.

The term "sample loop" as used herein may denote any kind of sample storage volume, i.e. a volume allowing to store at least a certain amount of sample fluid, which may be a fluid conduit (e.g. a fluid capillary) having a given length and thus volume, any kind of fluid container, a column (e.g. a trapping column), or the like.

In the first position, the valve may be configured for serially coupling the plurality of sample loops to provide the sample container in that an input of a first sample loop of the plurality of sample loops provides an input of the sample container, an input of a successive sample loop of the plurality of sample loops may be coupled to an output of previous sample loop of the plurality of sample loops, and an output of a last sample loop of the plurality of sample loops may provide an output of the sample container, with the length of the sample loop being provided between the input at the output of the sample container. In other words, the valve may be configured to provide a serial connection of the plurality of sample loops, with the sample container then being provided by such serial connection.

The valve may comprise a plurality of second positions, each second position providing access to a respective one of the plurality of sample loops.

The valve may comprise a stator, a first rotor configured for providing a rotational movement with respect to the stator, a first input port for receiving the sample fluid, a first output port may also or in addition be coupled to waste, a second input port for receiving a flow of a mobile phase, a second output port for outputting the flow of the mobile phase, a plurality of first couplers, such as grooves, for—in the first position—serially coupling the plurality of sample loops with each other and with the first input port, and a plurality of second couplers for coupling between the second input port and the second output port for allowing the flow of the mobile phase between the second input port and the second output port. At least some of the couplers may be switchable as both the first and the second couplers.

In one embodiment, the valve comprises a stator, a first rotor configured for providing a rotational movement with respect to the stator, a first input port for receiving the sample fluid or alternatively, for receiving a flow of a mobile phase, a first output port for outputting the content of the container or alternatively for outputting the content of the respectively connected loop.

In further embodiments e.g. pursuing the principle of "Feed Injection", the sample segment dispatching unit may be configured for pressurizing the sample container and for sequentially pushing out of the sample container each individual sample package of the plurality of individual sample packages.

A fluidic junction may be provided with a mobile phase flow path providing a flow of a mobile phase e.g. at a particular system pressure (i.e. downstream of a pumping unit for driving the mobile phase, e.g. before at the inlet of a chromatographic separation unit). The fluidic junction may be in fluidic communicating with a chromatographic column for separating compounds of the sample fluid and with the sample segment dispatching unit.

The sample segment dispatching unit may be configured for pressurizing the sample container to a pressure matching e.g. with the system phase pressure, and for sequentially pushing out each individual sample package of the plurality of individual sample packages from the sample container into the mobile phase flow path via the fluidic junction.

Embodiments of the present invention provide an injector configured for introducing a sample fluid into a mobile phase in a fluid processing unit, the injector comprising a sampling unit according to the aforementioned embodiments for receiving the sample fluid, providing a plurality of individual sample packages of the fluidic sample, and for individually injecting each of the plurality of individual sample packages into the mobile phase for further processing in the fluid processing unit.

Embodiments of the present invention provide a fluid processing unit for processing a sample fluid. Such fluid processing unit may comprise a sampling unit or an injector according to the aforementioned embodiments, configured for individually dispatching each of the plurality of individual sample packages for further processing in the fluid processing unit.

The fluid processing unit may be one of:
a chromatography unit for chromatographically separating compounds in the sample packages,
a two-dimensional chromatography unit for chromatographically separating a fluidic sample in a first chromatography dimension and providing the separated fluidic sample as the sample fluid to the sampling unit for injecting the sample packages into a second chromatography unit for further separating the injected sample packages,
a liquid chromatography unit for chromatographically separating liquid compounds in the sample packages,
a two-dimensional liquid chromatography unit for chromatographically separating a liquid sample in a first chromatography dimension and providing the separated liquid sample as the sample fluid to the sampling unit for injecting the sample packages into a second chromatography unit for further separating the injected sample packages,
a fractionating unit for fractionating compounds of the sample packages,
an analyzing unit for analyzing the sample packages, a mass spectrometer unit comprising a mass spectrometer.

Embodiments of the invention provide a separation system for separating compounds of a sample fluid in a mobile phase. Such fluid separation system may comprise a mobile phase drive, such as a pumping system, adapted to drive the mobile phase through the fluid separation system; a sampling unit or an injector according to the aforementioned embodiments, adapted to introduce the sample fluid into the mobile phase; and a separation unit, such as a chromatographic column, adapted for separating compounds of the sample fluid in the mobile phase.

The separation system may comprise at least one of: a detector adapted to detect separated compounds of the sample fluid; a collection unit adapted to collect separated compounds of the sample fluid; a data processing unit adapted to process data received from the fluid separation system; a degassing apparatus for degassing the mobile phase.

Embodiments may be provided by a two-dimensional fluid separation system for separating compounds of a fluidic sample, comprising a first fluid separation system for chromatographically separating compounds of the fluidic sample, a second fluid separation system for further chromatographically separating the separated compounds of the fluidic sample, and a sampling unit or an injector according to any of the aforementioned embodiments, configured for receiving the separated fluidic sample from the first fluid separation system as the sample fluid and for injecting the sample packages into a second liquid chromatography unit for further separating the injected sample packages.

Embodiments may be provided by a fluid separation system for separating compounds of a fluidic sample for chromatographically separating compounds of the fluidic sample, and a sampling unit or an injector according to any of the aforementioned embodiments, configured for receiving the separated fluidic sample from the fluid separation system as the sample fluid and for transferring the sample packages into a second sample separating device (e.g. a column) or onto the first sample separation unit for further separating the injected sample packages. Such embodiments may be referred to as "High Definition Liquid Chromatography" or "HDLC".

Embodiments may provide a method of handling a sample fluid, comprising: receiving and storing the sample fluid in a sample container having a length, providing a plurality of individual sample packages of the fluidic sample, each contained in a respective volume segment along the length of the sample container, and individually dispatching each of the plurality of individual sample packages for further processing in a fluid processing unit.

In further embodiments, the valve comprises at least one second position and several second outlets and one or several second inlets, such that by switching the valve into the second position several loops get fluidically connected to their respective flow paths comprising one or more of a respective second outlet, a respective sample separating device, a respective detection unit, and a respective sample collection unit. The fluidic flow can be provided in parallel or simultaneously to the respective second inlets or to the common second inlet of the said loops and can thus transfer several sample segments simultaneously to further respective sample processing.

Embodiments of the present invention might be embodied based on most conventionally available HPLC systems, such as the Agilent 1220, 1260 and 1290 Infinity LC Series (provided by the applicant Agilent Technologies).

One embodiment of an HPLC system comprises a pumping apparatus having a piston for reciprocation in a pump working chamber to compress liquid in the pump working chamber to a high pressure at which compressibility of the liquid becomes noticeable.

The separating device may include a chromatographic column providing the stationary phase. The column might be a glass, metal, ceramic or a composite material tube (e.g. with a diameter from 50 μm to 500 mm, or from 0.3 mm to 5 mm, and a length of 1 cm to 1 m) or a microfluidic column (as disclosed e.g. in EP 1577012 A1 or the Agilent 1200 Series HPLC-Chip/MS System provided by the applicant Agilent Technologies. The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually fine powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also been chosen so that the different compounds can be separated effectively. The mobile phase might comprise an organic solvent like e.g. methanol or acetonitrile, often diluted with water. For gradient operation water and organic solvent are delivered in separate containers, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid may be a liquid but may also be or comprise a gas and/or a supercritical fluid (as e.g. used in supercritical fluid chromatography—SFC—as disclosed e.g. in U.S. Pat. No. 4,982,597 A).

The pressure in the mobile phase might range from 0.2-200 MPa (2 to 2000 bar), in particular 10-150 MPa (100 to 1500 bar), and more particularly 50-120 MPa (500 to 1200 bar).

The HPLC system might further comprise a detector for detecting separated compounds of the sample fluid, a fractionating unit for outputting separated compounds of the sample fluid, or any combination thereof. Further details of HPLC system are disclosed with respect to the aforementioned Agilent HPLC series, provided by the applicant Agilent Technologies.

Embodiments of the invention can be partly or entirely embodied or supported by one or more suitable software programs (or software) or packages, which can be stored on or otherwise provided by any kind of non-transitory medium data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) may be applied in or by the control unit. For example, one embodiment of the present disclosure provides a non-transitory computer-readable medium that includes instructions stored thereon, such that when executed on a processor, the instructions perform the steps of the method of any of the embodiments disclosed herein.

In the context of this application, the term "fluidic sample", "sample fluid", or similar may particularly denote any liquid and/or gaseous medium, optionally including also solid particles, which is to be analyzed. This may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.), thereby splitting up or separating a separate fraction into a plurality of sub-fractions.

In the context of this application, the term "fraction" may particularly denote such a group of molecules or particles of a fluidic sample which have a certain property (such as mass, volume, chemical properties, etc.) in common according to which the separation has been carried out. However, molecules or particles relating to one fraction can still have some degree of heterogeneity, i.e. can be further separated in accordance with another separation criterion.

In the context of this application, the term "downstream" may particularly denote that a fluidic member located downstream compared to another fluidic member will only be brought in interaction with a fluidic sample or its components after interaction of those with the other fluidic member (hence being arranged upstream). Therefore, the terms "downstream" and "upstream" relate to a general flowing direction of the mobile phase and/or the fluidic sample or its components, but do not necessarily imply a direct uninterrupted fluidic connection from the upstream to the downstream system parts.

In the context of this application, the term "sample separation apparatus" may particularly denote any apparatus which is capable of separating different fractions of a fluidic sample by applying a certain separation technique. Particularly, two separation units may be provided in such a sample separation apparatus when being configured for a two-dimensional separation. This means that the sample or any of its parts or subset(s) is first separated in accordance with a first separation criterion, and is subsequently separated in accordance with a second separation criterion, which may be the same or different.

The terms "separation unit", "separation device" or similar may particularly denote a fluidic member through which a fluidic sample is guided and which is configured so that, upon conducting the fluidic sample through the separation unit, the fluidic sample or some of its components will be at least partially separated into different groups of molecules or particles (called fractions or sub-fractions, respectively) according to a certain selection criterion. An example for a separation unit is a liquid chromatography column which is capable of selectively retarding different fractions of the fluidic sample.

In the context of this application, the terms "fluid drive" or "mobile phase drive" may particularly denote any kind of pump or fluid flow source or supply which is configured for conducting a mobile phase and/or a fluidic sample along a fluidic path. A corresponding fluid supply system may be configured for metering two or more fluids in controlled proportions and for supplying a resultant mixture as a mobile phase. It is possible to provide a plurality of solvent supply lines, each fluidically connected with a respective reservoir containing a respective fluid, a proportioning appliance interposed between the solvent supply lines and the inlet of the fluid drive, the proportioning appliance configured for modulating solvent composition by sequentially coupling selected ones of the solvent supply lines with the inlet of the fluid drive, wherein the fluid drive is configured for taking in fluids from the selected solvent supply lines and for supplying a mixture of the fluids at its outlet. More particularly, one fluid drive can be configured to provide a mobile phase flow which drives or carries the fluidic sample through a respective separation unit, whereas another fluid drive can be configured to provide a further mobile phase flow which drives or carries the fluidic sample or its parts after treatment by respective separation unit, through a further separation unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawing(s). Features that are substantially or functionally equal or similar will be referred to by the same reference sign(s). The illustration in the drawing is schematic.

DETAILED DESCRIPTION

Figure 1:
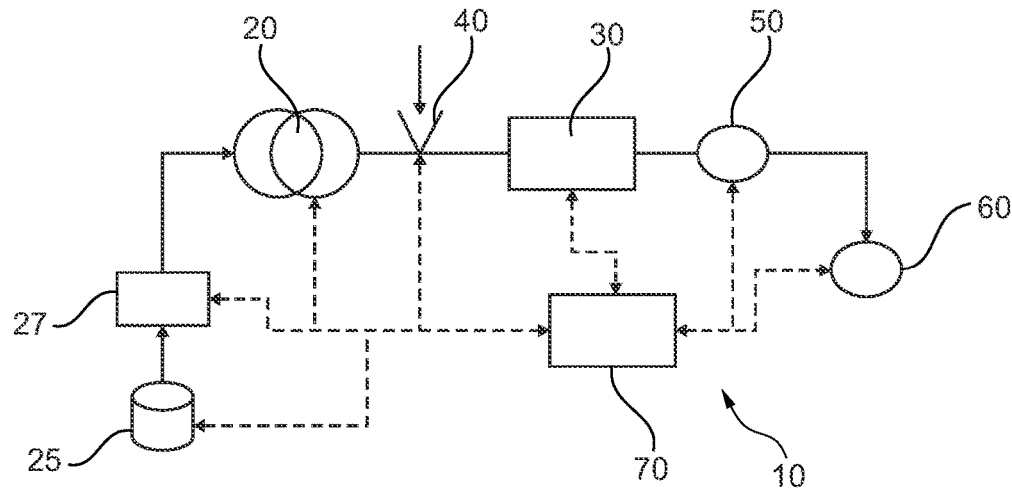
FIG. 1 illustrates an example of a liquid separation system in accordance with embodiments of the present disclosure, e.g. used in high performance liquid chromatography (HPLC).

Referring now in greater detail to the drawings, FIG. 1 depicts a general schematic of a liquid separation system 10. A pump 20 receives a mobile phase from a solvent supply 25, typically via a degasser 27, which degases the mobile phase and thus reduces the amount of dissolved gases in it. The pump 20—as a mobile phase drive—drives the mobile phase through a separating device 30 (such as a chromatographic column) comprising a stationary phase. A first sampling unit 40 (also referred to as sample dispatcher, sample introduction apparatus, sample injector, etc.) is provided between the pump 20 and the separating device 30 in order to subject or add (often referred to as sample introduction) portions of one or more sample fluids into the flow of mobile phase (denoted by reference numeral 85, see also FIG. 2). The stationary phase of the separating device 30 is adapted for separating compounds of the sample fluid, e.g. a liquid. A detector 50 is provided for detecting separated compounds of the sample fluid. A fractionating unit 60 can be provided for outputting separated compounds of sample fluid.

Figure 2:
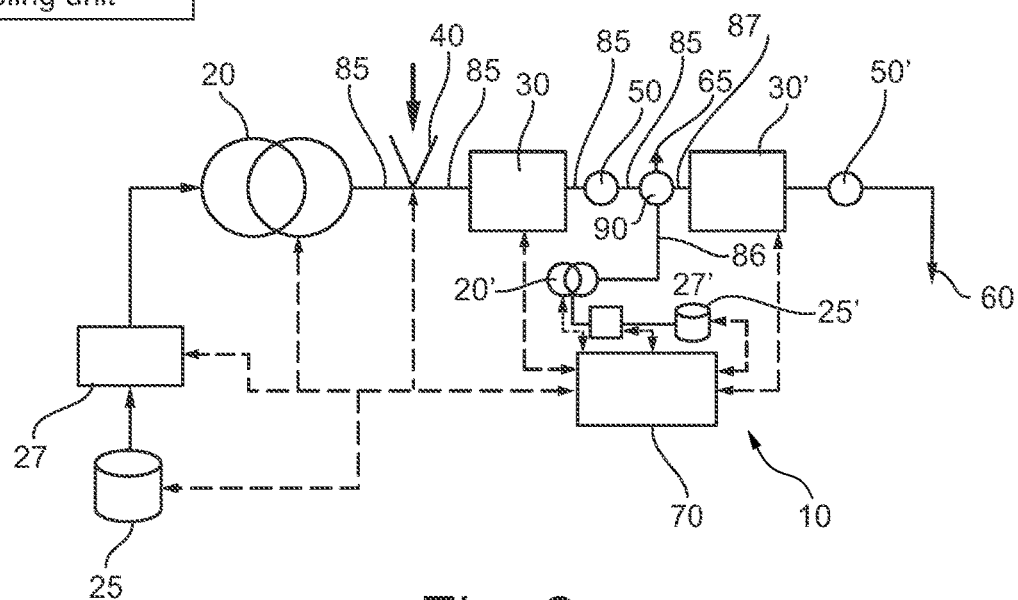
FIG. 2 illustrates an example of the liquid separation system being configured as a two-dimensional separation unit according to other embodiments of the present disclosure.

FIG. 2 illustrates an embodiment of the liquid separation system 10 being configured as a two-dimensional separation unit, which is based on the one-dimensional separation unit as shown in FIG. 1, however, with additional components and features to provide the second-dimension separation. A second pump, as second fluid drive unit 20', receives another mobile phase from a second solvent supply 25', typically via a second degasser 27', which degases the other mobile phase and thus reduces the amount of gases dissolved in the other mobile phase.

A second sampling unit 90 is provided for receiving the separated fluidic sample from the separating device 30 of first fluid separation dimension and for injecting sample packages derived from the separated fluidic sample of the first fluid separation dimension into a separating device 30' of the second fluid separation dimension for further separating the injected sample packages. The second sampling unit 90 is thus provided for transferring the separated fluidic sample, or portions thereof, from the first dimension (reference numerals 20, 30, . . . ) to the second dimension (reference numerals 20', 30', . . . ). The fluidic sample is separated into multiple fractions by the first dimension, and at least some of the fractions, or parts/slices of those, are transferred (modulated) into the second separation path and further separated into multiple sub-fractions by the second dimension.

The second sampling unit 90 may be embodied as or comprise a fluidic switch, such as a fluidic valve, e.g. as disclosed in the aforementioned US20160334031A1, and may alternatively or in addition comprise or be directly or indirectly attached to one or more sample containers for receiving and at least temporarily storing the separated fluidic sample of the first fluid separation dimension or at least parts thereof. Each sample container may be embodied as known in the art allowing to receive and at least temporarily store fluid, e.g. a sample loop, a trapping column, a sample accommodation volume having length, or the like.

The detector 50 is provided for detecting separated compounds of the sample fluid in the first dimension and may be used e.g. for monitoring or evaluation of the chromatographical data of the first dimension e.g. when operating the fluid processing device 10 in one of a "heart-cutting", "comprehensive", high definition sampling as well as in any other operation mode. A further (second) detector 50' is arranged downstream of the second sampling unit 90 for detecting the second-dimension separation. A fractionating unit 60 can be provided for outputting separated compounds of sample fluid. It is also possible that the processed fluid is directed to a waste 65.

In both embodiments of FIGS. 1 and 2, while each of the mobile phases can be comprised of one solvent only, it may also be mixed from plural solvents. Such mixing might be a low pressure mixing and provided upstream of the fluid drive units 20, 20', so that the respective fluid drive unit 20, 20' already receives and pumps the mixed solvents as the mobile phase. Alternatively, any of the fluid drive units 20, 20' might be comprised of plural individual pumping units, with the plurality of the pumping units each receiving and pumping a different solvent or mixture, so that the mixing of the mobile phase (as received by the respective separating unit 30, 30') occurs at high pressure and downstream of the respective fluid drive unit 20, 20' (or as part thereof). The composition (mixture) of the mobile phase may be kept constant over time, the so called isocratic mode, or varied over time, the so called gradient mode.

Further in both embodiments of FIGS. 1 and 2, a data processing unit, control unit or processor 70, which can be a conventional PC or workstation, might be coupled (as indicated by the dotted arrows) to one or more of the devices in the fluid processing device 10 in order to receive information and/or control operation. For example, the processor 70 might control operation of the fluid drive units 20, 20' (e.g. setting control parameters) and receive therefrom information regarding the actual working conditions (such as output pressure, flow rate, etc. at an outlet of the pump 20, 20'). The processor 70 might also control operation of the solvent supply 25, 25' (e.g. setting the solvents or solvent mixture to be supplied) and/or the degasser 27, 27' (e.g. setting control parameters such as vacuum level) and might receive therefrom information regarding the actual working conditions (such as solvent composition supplied over time, flow rate, vacuum level, etc.). The respective separating unit 30, 30' may also be controlled by the processor 70 (e.g. selecting a specific flow path or column, setting operation temperature, etc.), and send—in return—information (e.g. operating conditions) to the processor 70. Accordingly, the detectors 50 and 50' may be controlled by the processor 70 (e.g. with respect to spectral or wavelength settings, setting time constants, start/stop data acquisition), and send information (e.g. about the detected sample compounds) to the processor 70. The processor 70 may also control operation of the fractionating unit (e.g. in conjunction with data received from the detector 50). The processor 70 may include a storage device, which allows to store all or selected information of the analytical process and also to retrieve stored information (which may be advantageous for the above-mentioned scouting operation) from previous analytical processes. The processor 70 may include software or firmware for data evaluation and for providing data evaluation results for further storage or as an output for a human interface.

In some embodiments according to both FIGS. 1 and 2, the processor 70 further controls operation of the first sampling unit 40 and/or the second sampling unit 90, such as by controlling input and/or output of the respective sampling unit, e.g. by controlling at least one of receipt of sample fluid, at least temporarily storing received sample fluid or a part thereof, and dispatching the received sample fluid or portions thereof e.g. by controlling sample injection or synchronization sample injection with operating conditions of one or both of the fluid drive units 20, 20'.

Turning back to FIG. 2, the first fluid drive unit 20 is hence configured for driving a first fluid (composed of the mobile phase and the therein injected fluidic sample) along a first flow path 85 which is located partly upstream of the second sampling unit 90 and partly downstream of the second sampling unit 90. The second fluid drive unit 20' is configured for driving a second fluid embodied as a mobile phase along a second flow path 86 which is also located partly upstream of the second sampling unit 90 and partly downstream of the second sampling unit 90.

The second sampling unit 90 is fluidically coupled to both the first flow path 85 and to the second flow path 86 (however essentially not directly connecting them fluidically together) and is switchable by the processor 70 for transferring part of the first fluid from the first flow path 85 into the second flow path 86, such as without interruption of fluid flow along the first flow path 85 and along the second flow path 86 during this switching operation (as described e.g. in EP3032253A1 by the same applicant). A direct fluid connection between the first flow path 85 and the second flow path 86 may be avoided.

The fluid processing device 10 shown in FIG. 2 is configured as a two-dimensional sample separation device configured for separating the first fluid into fractions (which can be detected by detector 50) and at least one of the fractions of the transferred first fluid into sub-fractions (which can be detected by detector 50').

In the following, some embodiments of the second sampling unit 90 shall be illustrated. It is clear that the first sampling unit 40 can be embodied in the same way and using the same principles of embodiment and operation. In the embodiments of FIGS. 3-5, the second sampling unit 90 is configured as a rotational valve having at least one rotor element rotor cooperating with a stator element, many details of which may be omitted for the sake of simplicity in the principal representations of the drawings. The rotor and stator elements are configured to provide a rotational movement with respect to each other. While in the shown figures the rotor elements are configured to provide such rotational movement with respect to the static stator element, it is clear that the functions of rotor and stator are exchangeable as well known in the art. Further, it is clear for those skilled in the art that there are many other possible embodiments for such rotational valve fulfilling the requirements of the second sampling unit 90. Also, instead of rotational valves, any other valve type as known in the art may be applied accordingly, such as translational valves, multiple cut-off valves, and other valves known in the art to connect and disconnect fluidic paths and controllable in a coordinated manner.

FIGS. 3A-3D illustrate a first examplary embodiment of the second sampling unit 90 being configured as a rotational valve 300 having an outer rotor element 310 and an inner rotor element 320, both cooperating with a stator (which for the sake of simplicity is not directly shown in the principal representation of FIG. 3 but only certain features thereof). FIGS. 3A-3D depict four different switching positions of the rotational valve 300. The rotor elements 310 and 320 and the stator are configured to provide a rotational movement with respect to each other. In the shown embodiment, the second sampling unit 90 comprises a plurality of sample loops, here in this exemplary embodiment three sample loops 330A, 330B, and 330C. It is clear, however, that any number of sample loops may be applied dependent on the requirements of the specific application and in particular on the number of sample segmentations to be provided as will be illustrated later.

Figure 3A:
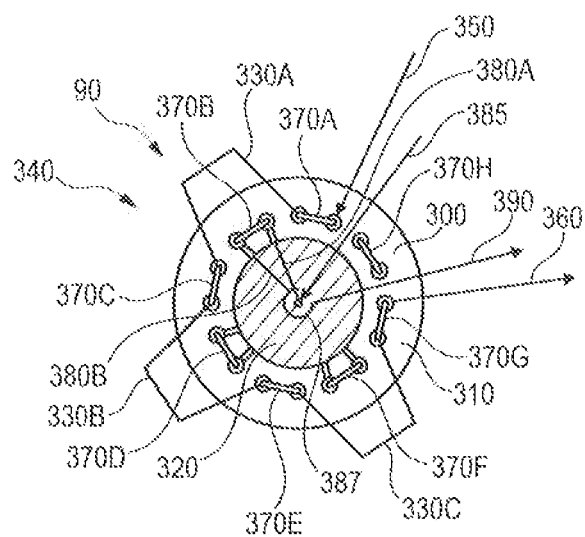
FIG. 3A illustrates an example of a second sampling unit of a liquid separation system in a first (fill) position, according to an embodiment of the present disclosure.
Figure 3B:
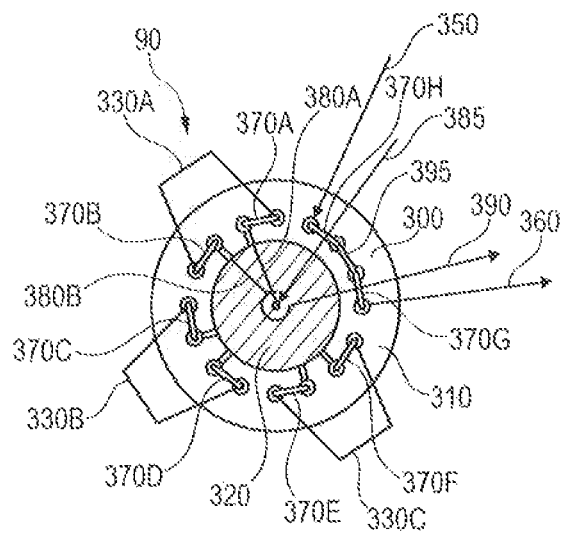
FIG. 3B illustrates the sampling unit of FIG. 3A in a second (dispatch) position in which a sample loop is individually accessible.
Figure 3C:
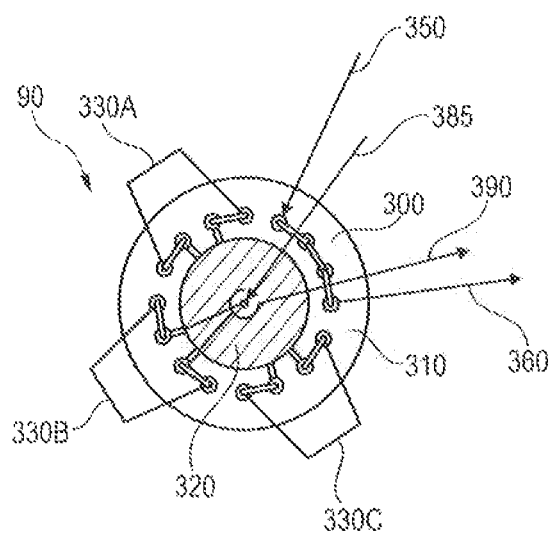
FIG. 3C illustrates the sampling unit of FIG. 3A in the second (dispath) position in which another sample loop is individually accessible.
Figure 3D:
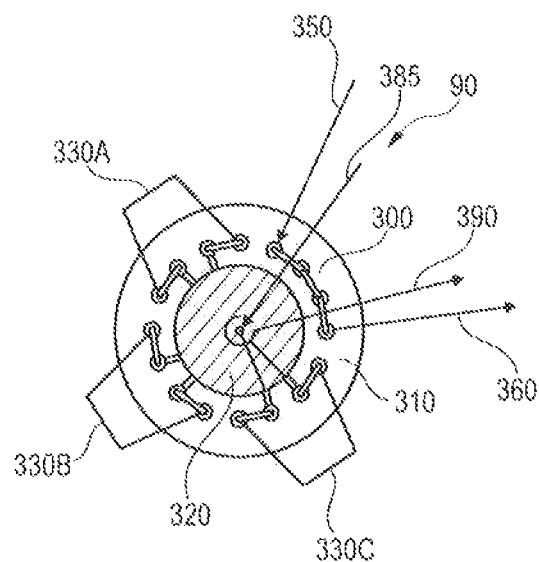
FIG. 3D illustrates the sampling unit of FIG. 3A in the second (dispatch) position in which another sample loop is individually accessible.

FIG. 3A represents the second sampling unit 90 in a first position (also referred to as "fill position") for introducing a sample fluid, while FIGS. 3B-3D represent the second sampling unit 90 in a plurality of second positions for individually dispatching individual sample packages from the sample fluid, with each of the FIGS. 3B-3D depicting dispatching a different one of the individual sample packages.

In more detail, FIG. 3A shows a first position for serially coupling the plurality of sample loops 330A-330C to provide a sample container 340, which is coupled between a first input line 350 and a first output line 360. The sample loops 330A-330C as well as the first input line 350 and the first output line 360 are (e.g. fixedly) coupled to respective ports in the stator. The outer rotor element 310 comprises a plurality of (tangential) grooves 370A-370H, which by rotational movement of the outer rotor element 310 can be moved in position. In the first position of FIG. 3A, groove 370A couples between the first input line 350 and a first end of the sample loop 330A, groove 370C couples between a second end of the sample loop 330A and a first end of the sample loop 330B, groove 370E couples between a second end of the sample loop 330B and a first end of the sample loop 330C, and groove 370G couples between a second end of the sample loop 330C and the first output line 360. Thus, the three sample loops 330A-330C are connected in series and coupled between the first input line 350 and the first output line 360, so that this series connection of the three sample loops 330A-330C provides the sample container 340.

The inner rotor element 320 comprises two grooves 380A, 380B having substantially radial orientation. The stator further comprises a central port to which a second input line 385 is coupled to, a radial groove 387 to which a second output line 390 is coupled to. In the first position as depicted in FIG. 3A, the second input line 385 is coupled via groove 380A to one end of the groove 370B, while the other end of the groove 370B is coupled via groove 380B to the radial groove 387, which in turn is coupled to the second output line 390. By this connection, the second input line 385 is basically directly connected to the second output line 390.

With respect to the embodiment of FIG. 2, the first input line 350 is provided by reference numeral 85 representing an output of the first dimension separation provided by the (first) separation unit 30, the first output line 360 is provided by waste 65, the second input line 385 is provided by reference numeral 86 for receiving a flow of mobile phase via the second flow path 86, and the second output line 390 is provided by line 87 coupling the second sampling unit 90 to the separating unit 30' of the second dimension and thus providing the sample input into the second dimension separation.

FIG. 3B illustrates a configuration of the second sampling unit 90 in a first one of second positions for decoupling and fluidically separating the plurality of sample loops 330A-330C from each other, so that one of the fluidically separated plurality of sample loops 330A-330C, namely sample loop 330A in FIG. 3B, can be accessed individually.

The only difference in position between FIGS. 3A and 3B is that the outer rotor element 310 has moved by one position (to the right or to the left, i.e. clockwise or counter-clockwise, which in this symmetrical embodiment has nearly the same effect except for the case that either the content of the groove 370G or 370A will be lost and the sample division points are shifted by the volume of the mentioned grooves). By this, the plurality of sample loops 330A-330C become physically isolated from each other, or in other words fluidically divided from each other, allowing to individually access each respective one of the plurality of sample loops 330A-330C.

In detail in FIG. 3B, grooves 370A and 370B are now (in concerted action with the radial features of the stator) coupling the sample loop 330A between the grooves 380A and 380B, so that the sample loop 330A is coupled between the second input line 385 and the second output line 390. Grooves 370C and 370D are coupling to the sample loop 330B, and grooves 370E and 370F are coupling to the sample loop 330B. However, as there are no further grooves or other connections coupling to the respective ports coupled to the grooves 370C-370F, the sample loops 330B-330C are decoupled from the flow path provided either between the first input line 350 and the first output line 360 or the flow path provided between the second input line 385 and the second output line 390, by which means the sample fractions are stored in these loops.

The stator in FIGS. 3A-3D further comprises a groove 395, so that in each of the second positions shown in the FIGS. 3B-3D the first input line 350 is coupled to the first output line 360 by the groove 395 and respective two of the grooves 370A-370H. In FIG. 3B, the grooves 370G and 370H are respectively connecting between the first input line 350 and the groove 395 as well between the groove 395 and the first output line 360.

FIGS. 3C-3D illustrate the respective coupling and connection schemes when rotating the inner rotor element 320 in anti-clockwise direction in order to couple sample loop 330B between the second input line 385 and the second output line 390 in FIG. 3C, and in order to couple sample loop 330C between the second input line 385 and the second output line 390 in FIG. 3D. Accordingly, by respectively rotating the inner rotor element 320, each of the sample loops 330A-330C can be addressed or dialed individually and coupled between the second input line 385 and the second output line 390.

Operation of the second sampling unit 90 shall be explained the following.

Starting from the first position (or fill position) in FIG. 3A, a sample fluid is introduced via the first input line 350 and flows successively through the sample loops 330A-330C, given a continuous flow of the sample fluid. Any fluid present in the sample loops 330A-330C before the introduction of the sample fluid will be pushed out via the first output line 360 e.g. into waste. That means that after a while of introducing the sample fluid via the first input line 350, each of the sample loops 330A-330C is filled with (a respective portion of) the sample fluid.

In case of the embodiment of the above FIG. 2, representing a two-dimensional separation unit and with the first input line 50 representing the output from the first dimensional separation (i.e. after separation by the separation device 30), the sample fluid introduced via the first input line 350 into the sample loops 330A-330C is already pre-fractionated (by the separating device 30), thus having a plurality of different compounds with a different spatial distribution of their respective concentration. That means that during the process of introducing the (pre-fractionating) sample fluid into the second sampling unit 90, a different (spatial) distribution of concentration for the respective pre-fractionated compounds in the sample fluid will be present along the length of the sample container 340 and thus in each of the sample loops 330A-330C. Accordingly, by adequately controlling the flow of the sample fluid through the sample container 340, it can be accomplished that due to a spatial distribution of concentration of compounds in the container 340 along its length different concentrations or amounts of single respective sample component will be present in each of the sample loops 330A-330C. The flow of sample fluid may be controlled in order to ensure that essentially all or at least most of sample fluid portion containing compounds of interest is preserved in the container 340, whereas the preceding and subsequent portions of the fluid supplied via the line 350 are discarded into waste 360.

Accordingly, with the configuration of the sampling unit 90 as shown in first position of FIG. 3A, the sample container 340 can receive and store the sample fluid (via the first input line 350). Dependent on the homogeneity (or better to say the non-homogeneity) of the sample fluid along the length of the sample container 340, each of the sample loops 330A-330C will comprise an individual sample package of the fluidic sample as contained in a respective volume segment of the respective sample loop.

When switching the outer rotor element 310 from the first position (as depicted in FIG. 3A) into the second position (as depicted in the FIGS. 3B-3D), the sample loops 330A-330C become physically (and thus fluidically) separated from each other, so that each of the sample loops 330A-330C contains an individual sample package of the fluidic sample. Further by switching the outer rotor element 310, the first input line 350 is now separated from the sample loops 330A-330C and directly coupled to the first output line 360, so that any flow introduced via the first input line 350 will not pass the sample loops 330A-330C but go (after passing the respective grooves, e.g. grooves 370H, 395, and 370G in FIG. 3B) directly to the first output line 360 (e.g. into waste).

By means of rotation of the inner rotor element 320, each of the sample loops 330A-330C can be individually dialed, i.e. coupled between the second input line 385 and the second output line 390 and thus accessed (or, in other words, "read out") individually.

In case of the sampling unit 90 being part of a two-dimensional separation system, e.g. as depicted in FIG. 2, by rotation of the inner rotor element 320 each individual sample package of the fluidic sample as contained in a respective one of the sample loops 330A-330C can be dispatched (or, in other words, injected) into the second dimensional separation path 86, 87 between the pump 20' and the separation unit (e.g., column) 30' for further separation.

As apparent from the above, the sampling unit 90 according to embodiments of the present invention provides a "one-shot" serial storing of the respective sample packages of the fluidic sample into the sample loops 330A-330C, e.g. in contrast to a sequential "one after the other" storing of such sample packages as described in the aforementioned US20170219540A1. E.g. when referring to FIG. 3 of US20170219540A1, the valve 202 will switch "one after the other" between the different sample loops 180 in order to respective deposit/store a respective sample package in a respective one of the sample loops 180. Thus, in a sense, embodiments of the invention allow a "parallel storing" of the individual sample packages in "one shot", i.e. by only requiring one switching step (e.g. by the outer rotor element 310 in the embodiment of FIG. 3), in contrast to the "sequential storing" mode as known in the art, e.g. the aforementioned US20170219540A1, requiring n switching steps for filling n sample loops.

It is also apparent from the above, the granularity of the sample packages, i.e. the number of different sample packages as separated from the sample container 340, as well as the respective volume of each sample package can be varied and controlled by the number and/or geometry of the sample loops 330 as applied in the second sampling unit 90. While the respective sample loops 330 may be provided substantially in the same way, i.e. having substantially the same volume and/or geometry, any variation therefrom can be considered and applied dependent on the specific requirements e.g. of an application.

As also mentioned above, different switching schemes and configurations are also possible, including e.g. stacked rotors and/or stators, multiple valves, a non-rotary (e.g. linear) valve, an X-Y-translational valve or switching plane, and the like.

The (second) sampling unit 90 can also be applied in other configurations as the exemplary embodiment of FIG. 2. As an example, the (first) sampling unit 40, as depicted in either one of the FIG. 1 or 2 can be embodied as described in FIG. 3, with the first input line 350 being used for filling in the sample fluid into the sample container 340, the first output line 360 may also couple e.g. to waste, and the second input line 385 representing the fluid line coming from the pumping unit 20 and the second output line 390 representing the fluid line going towards the separation unit 30.

Figure 3E:
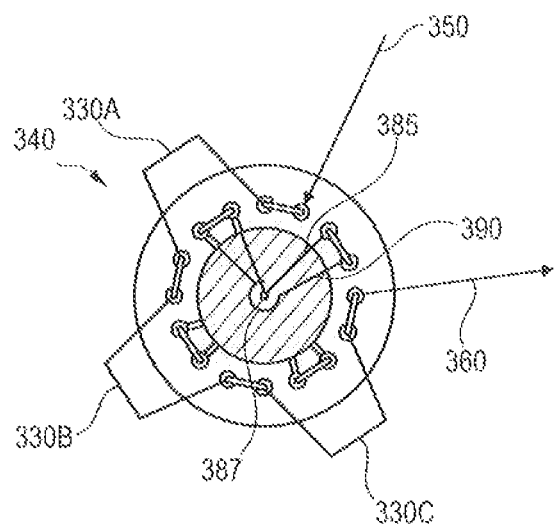
FIG. 3E illustrates an example of a second sampling unit of a liquid separation system in a first (fill) position, according to another embodiment of the present disclosure.
Figure 3F:
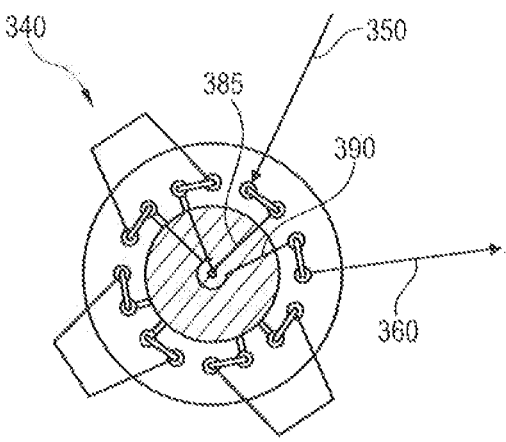
FIG. 3F illustrates the sampling unit of FIG. 3E in a second (dispatch) position in which a sample loop is individually accessible.
Figure 3G:
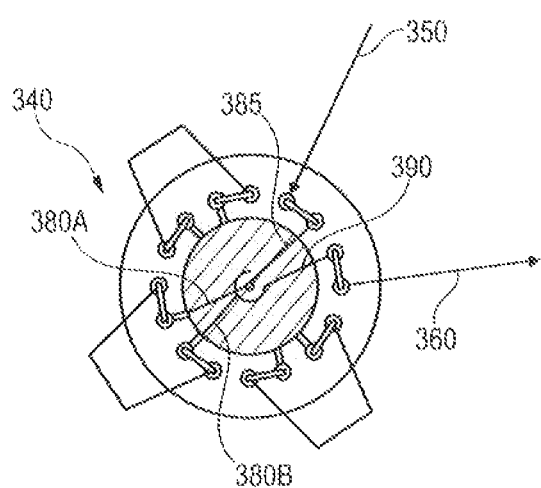
FIG. 3G illustrates the sampling unit of FIG. 3E in the second (dispatch) position in which another sample loop is individually accessible.
Figure 3H:
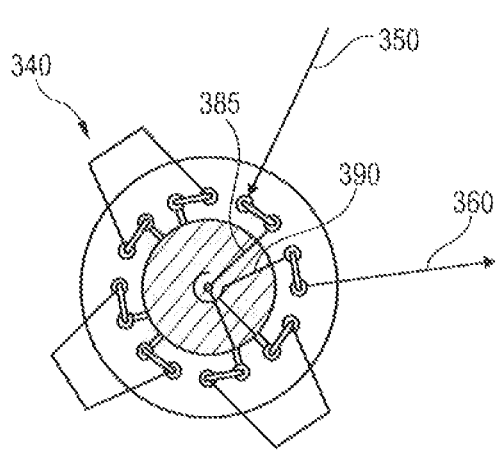
FIG. 3H illustrates the sampling unit of FIG. 3E in the second (dispatch) position in which another sample loop is individually accessible.

FIGS. 3E-3H depict an alternative example, similar to the embodiment of FIGS. 3A-3D, so that for the sake of simplicity only differences shall be explained here. The embodiment of FIGS. 3E-3H implements a so-called "Park Deck" valve configuration, which may be applicable both in 2D-LC as well as in "Single-Stack" (HDLC) configuration setups. In this embodiment, there are only the two external fluidic connections 350 and 360, which can be used alternatingly for loading the container 340 and dialing isolated volume sections, e.g. the exemplary three sample loops 330A-330C as depicted in FIGS. 3E-3H. The groove 395 (of the FIGS. 3A-3D) is eliminated, and the second input line 385 and the second output line 390 are connected respectively to the respective ports where the groove 395 is coupled in the FIGS. 3A-3D. In this embodiment of FIGS. 3E-3H, the first input line 350 and the first output line 360 serve for both loading the container 340 (when the embodiment is connected to the first dimension separation, e.g. downstream of the separation unit 30, by means of the corresponding modulation valve (not shown here) as depicted in FIG. 3E ("Single Stack")). In the positions of FIGS. 3F-3H, the content of a respective single one of the three sample loops 330A-330C is dialed. This embodiment can be connected to the second dimension separation, e.g. upstream of the second separation unit 30', by means of a corresponding modulation valve (not shown here).

FIGS. 4A-4D illustrate a second examplary embodiment of the second sampling unit 90 also being configured as a rotational valve 400, however, only having one rotor element 410 cooperating with a stator which, again for the sake of simplicity, is not directly shown in the principal representation of FIG. 4. FIGS. 4A-4D depict, in substantially the same way and order of operation as in FIGS. 3A-3D, four different switching positions of the rotational valve 400. Features in FIG. 4 having the same functionality as in FIG. 3 are depicted with the same reference numerals.

As said above, the substantial difference between the embodiments of FIGS. 4 and 3 is that the functionality of the inner and outer rotor elements 320 and 310 (of FIG. 3) is provided by the (single) rotor element 410 (in FIG. 4). In order to cover both functions of (1) fluidically separating the plurality of sample loops 330A-330C from each other and (2) individually addressing each one of the separated sample loops 330A-330C, the grooves in the rotor element 410 are placed not rotation-symmetrically but rather eccentrically as shown in FIG. 4.

Figure 4A:
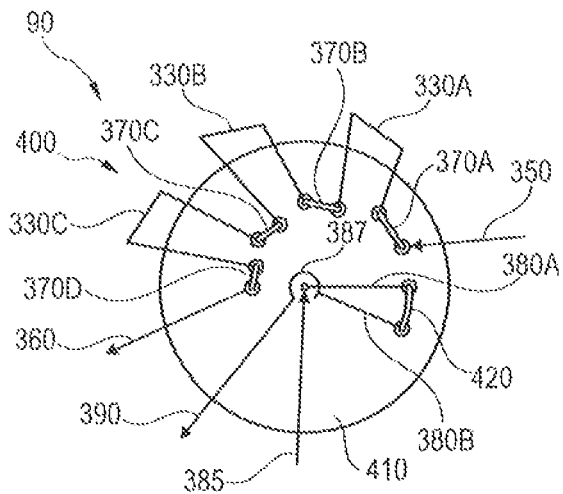
FIG. 4A illustrates an example of a second sampling unit of a liquid separation systein in a first (fill) position, according to another embodiment of the present disclosure.
Figure 4B:
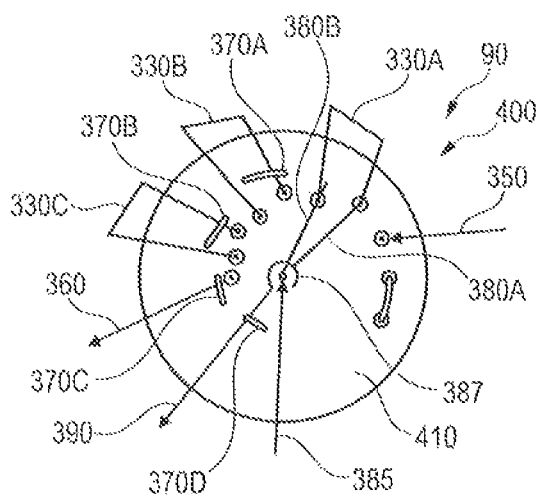
FIG. 4B illustrates the sampling unit of FIG. 4A in a second (dispatch) position in which a sample loop is individually accessible.
Figure 4C:
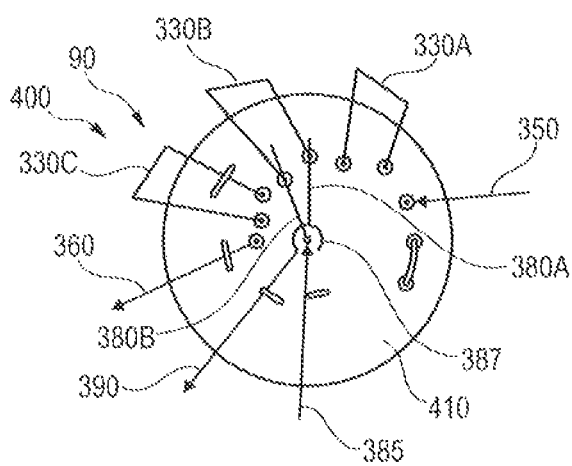
FIG. 4C illustrates the sampling unit of FIG. 4A in the second (dispatch) position in which another sample loop is individually accessible.
Figure 4D:
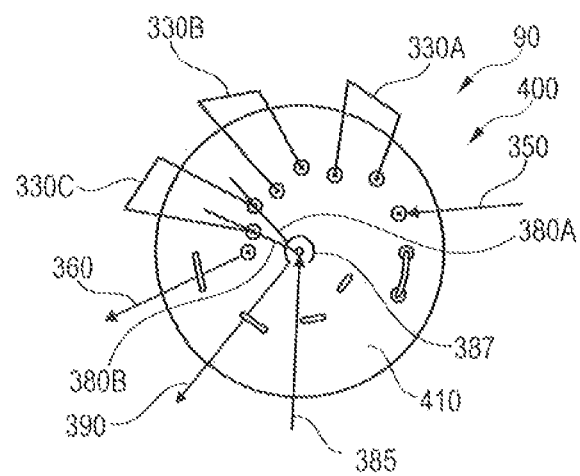
FIG. 4D illustrates the sampling unit of FIG. 4A in the second (dispatch) position in which another sample loop is individually accessible.

FIG. 4A represents the second sampling unit 90 in the first position (also referred to as "fill position") for introducing the sample fluid, while FIGS. 4B-4D represent the second sampling unit 90 in a plurality of second positions for individually dispatching individual sample packages from the sample fluid, with each of the FIGS. 4B-4D depicting dispatching one of the individual sample packages.

In more detail, FIG. 4A shows the first position with the plurality of sample loops 330A-330C being serially coupled to provide the sample container 340, which is coupled between the first input line 350 and the first output line 360.

The sample loops 330A-330C as well as the first input line 350 and the first output line 360 are (e.g. fixedly) coupled to respective ports in the stator. The rotor element 410 comprises a plurality of (radial) grooves 370A-370D, which by rotational movement of the rotor element 410 can be moved in position. In the first position of FIG. 4A, groove 370A couples between the first input line 350 and a first end of the sample loop 330A, groove 370B couples between a second end of the sample loop 330A and a first end of the sample loop 330B, groove 370C couples between a second end of the sample loop 330B and a first end of the sample loop 330C, and groove 370D couples between a second end of the sample loop 330C and the first output line 360. Thus, the three sample loops 330A-330C are connected in series and coupled between the first input line 350 and the first output line 360, so that this series connection of the three sample loops 330A-330C provides the sample container 340.

Similar to the embodiments of FIG. 3, the rotor element 410 comprises the two grooves 380A, 380B having an orientation substantially perpendicular to the (radial) grooves 370A-370D. The stator further comprises the central port to which a second input line 385 is coupled to, the radial groove 387 to which the second output line 390 is coupled to. In the first position as depicted in FIG. 4A, the second input line 385 is coupled via groove 380A to one end of an additional groove 420, while the other end of the groove 420 is coupled via groove 380B to the radial groove 387, which in turn is coupled to the second output line 390. By this connection, the second input line 385 is basically directly connected to the second output line 390.

FIG. 4B illustrates a configuration of the second sampling unit 90 in a first one of second positions for decoupling and fluidically separating the plurality of sample loops 330A-330C from each other, so that one of the fluidically separated plurality of sample loops 330A-330C, namely sample loop 330A in FIG. 4B, can be accessed individually.

The only difference in position between FIGS. 4A and 4B is that the rotor element 410 has moved by one position counter-clockwise. By this, the plurality of sample loops 330A-330C become physically separated from each other, or in other words fluidically divided from each other, because the grooves 370A-370D are not coupling any more (as in FIG. 4A) between the sample loops 330A-330C, thus allowing to individually access each respective one of the plurality of sample loops 330A-330C.

In detail in FIG. 4B, the sample loop 330A is coupled between the grooves 380A and 380B, so that the sample loop 330A is coupled between the second input line 385 and the second output line 390.

FIGS. 4C-4D illustrate the respective coupling and connection schemes when rotating the rotor element 410 further anticlockwise in order to couple sample loop 330B between the second input line 385 and the second output line 390 in FIG. 4C, and in order to couple sample loop 330C between the second input line 385 and the second output line 390 in FIG. 4D. Accordingly, by respectively rotating the rotor element 410, each of the sample loops 330A-330C can be addressed individually and coupled between the second input line 385 and the second output line 390.

Operation of the second sampling unit 90 of FIGS. 4A-4D is substantially the same as aforedescribed with respect to FIGS. 3A-3D which also applies, mutatis mutandis, here. Starting from the first position (or fill position) in FIG. 4A, a sample fluid is introduced via the first input line 350 and flows successively through the sample loops 330A-330C, given a continuous flow of the sample fluid. Any fluid present in the sample loops 330A-330C before the introduction of the sample fluid will be pushed out via the first output line 360 e.g. into waste. That means that after a while of introducing the sample fluid via the first input line 350, each of the sample loops 330A-330C is filled with the sample fluid. Accordingly, the sample container 340 can receive and store the sample fluid (via the first input line 350). Dependent on the homogeneity (or better to say the non-homogeneity) of the sample fluid along the length of the sample container 340, each of the sample loops 330A-330C will comprise an individual sample package of the fluidic sample as contained in a respective volume segment of the respective sample loop.

When switching the rotor element 410 from the first position (as depicted in FIG. 4A) into the second position (as depicted in the FIGS. 4B-4D), the sample loops 330A-330C become physically and thus fluidically separated from each other, so that each of the sample loops 330A-330C contains an individual sample package of the fluidic sample. Further, the first input line 350 is now separated from the sample loops 330A-330C and may be directly coupled to the first output line 360 (e.g. via connections not shown in the figures), so that any flow of introduced via the first input line 350 will not pass the sample loops 330A-330C but go to the first output line 360 (e.g. into waste).

By (further) rotating the rotor element 410, each of the sample loops 330A-330C can be individually coupled between the second input line 385 and the second output line 390 and thus accessed (or, in other words, "read out" individually).

An advantage of the embodiment of FIG. 4 over FIG. 3 is that the entire functionality can be made available by means of a single rotor, which can eliminate the need for a second rotor drive and complex mechanical construction.

It is possible to implement also this embodiment as a so-called "Park Deck" valve (as in the aforementioned US20170219540A1) by connecting line 390 to the line 350, which however would require additional features in the valve to establish a direct connection between ports of the lines 350 and 360 in the positions 4B-4D. Such complex construction can be for instance realized in a multilayer structure (e.g. metal, ceramic or plastic microfluidics).

FIGS. 5A-5E illustrate a third exemplary embodiment of the second sampling unit 90 also being configured as a rotational valve 500 having, again as in FIG. 4, only one rotor element 510 cooperating with a stator which, again for the sake of simplicity, is not directly shown in the principal representation of FIG. 5. FIGS. 5A-5E depict, in substantially the same way and order of operation as in FIGS. 3A-3D and FIGS. 4A-4D, five different switching positions of the rotational valve 500. Features in FIG. 5 having the same functionality as in FIGS. 3 and 4 are depicted with the same reference numerals.

As in the embodiments of FIG. 4, the functionality of the inner and outer rotor elements 320 and 310 (of FIG. 3) is provided by the (single) rotor element 510 (in FIG. 5). In order to cover both functions of (1) fluidically separating the plurality of sample loops 330 from each other and (2) individually addressing each one of the separated sample loops 330, the rotor element 510 is shaped non-symmetrically in FIG. 5. The exemplary embodiment of FIG. 5 comprises four sample loops 330A-330D (in contrast to the three sample loops 330A-330C of the exemplary embodiments of FIGS. 3 and 4).

Figure 5A:
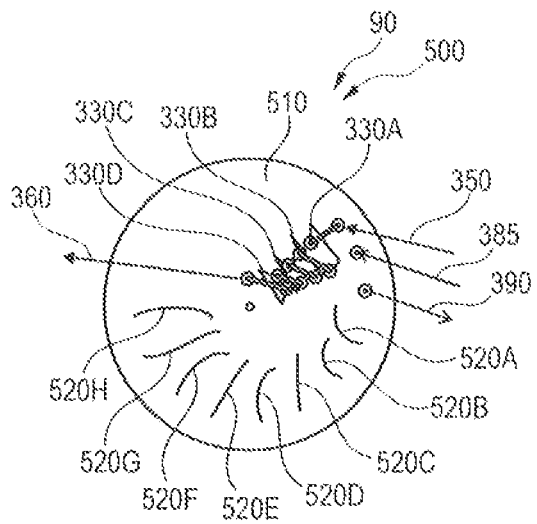
FIG. 5A illustrates an example of a second sampling unit of a liquid separation system in a first (fill) position, according to another embodiment of the present disclosure.

FIG. 5A represents the second sampling unit 90 in the first position (also referred to as "fill position") for introducing the sample fluid, while FIGS. 5B-5E represent the second sampling unit 90 in a plurality of second positions for individually dispatching individual sample packages from the sample fluid, with each of the FIGS. 5B-5E depicting dispatching one of the individual sample packages.

In more detail, FIG. 5A shows the first position with the plurality of sample loops 330A-330D being serially coupled to provide the sample container 340, which is coupled between the first input line 350 and the first output line 360. The sample loops 330A-330D as well as the first input line 350 and the first output line 360 are (e.g. fixedly) coupled to respective ports in the stator. The rotor element 510 comprises a plurality of grooves 370A-370E, which can be best seen in FIGS. 5B-5E, and which by rotational movement of the rotor element 510 can be moved in position. In the first position of FIG. 5A, groove 370A couples between the first input line 350 and a first end of the sample loop 330A, groove 370B couples between a second end of the sample loop 330A and a first end of the sample loop 330B, groove 370C couples between a second end of the sample loop 330B and a first end of the sample loop 330C, groove 370D couples between a second end of the sample loop 330C and a first end of the sample loop 330D, and groove 370E couples between a second end of the sample loop 330D and the first output line 360. Thus, the four sample loops 330A-330D are connected in series and coupled between the first input line 350 and the first output line 360, so that this series connection of the four sample loops 330A-330D provides the sample container 340.

Different from the embodiments of FIGS. 3 and 4, the rotor element 510 further comprises eight grooves 520A-520H. The stator further comprises two ports to which respectively the second input line 385 and the second output line 390 are coupled to. In the first position as depicted in FIG. 5A, the second input line 385 is coupled via a (not shown) connection, which may be implemented in either one or both of the stator and rotor element 510, to the second output line 390. By this connection, the second input line 385 is basically directly connected to the second output line 390.

Figure 5B:
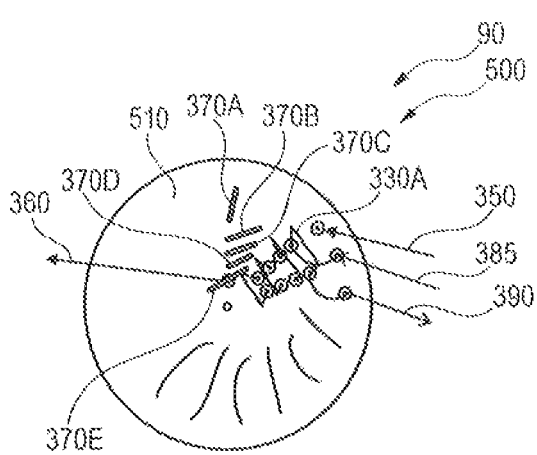
FIG. 5B illustrates the sampling uint of FIG. 5A in a second (dispatch) position in which a sample loop is individually accessible.

FIG. 5B illustrates a configuration of the second sampling unit 90 in a first one of second positions for decoupling and fluidically separating the plurality of sample loops 330A-330D from each other, so that one of the fluidically separated plurality of sample loops 330A-330D, namely sample loop 330A in FIG. 5B, can be accessed individually.

The only difference in position between FIGS. 5A and 5B is that the rotor element 510 has moved by one position anticlockwise. By this, the plurality of sample loops 330A-330D become physically separated from each other, or in other words fluidically divided from each other, because the grooves 370A-370E are not coupling any more (as in FIG. 5A) between the sample loops 330A-330D, thus allowing to individually access each respective one of the plurality of sample loops 330A-330D.

In detail in FIG. 5B, the sample loop 330A is coupled between the grooves 520A and 520B, so that the sample loop 330A is coupled between the second input line 385 and the second output line 390.

Figure 5C:
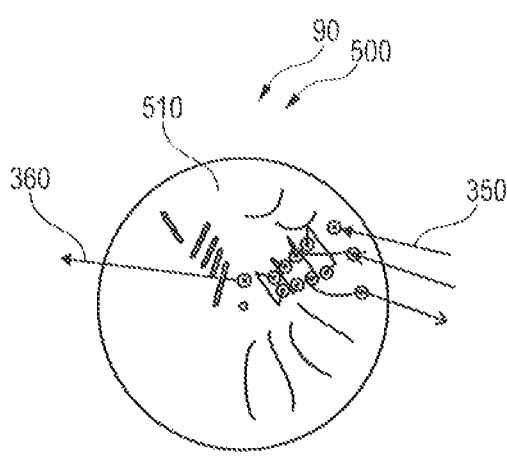
FIG. 5C illustrates the sampling unit of FIG. 5A in the second (dispatch) position in which another sample loop is individually accessible.
Figure 5D:
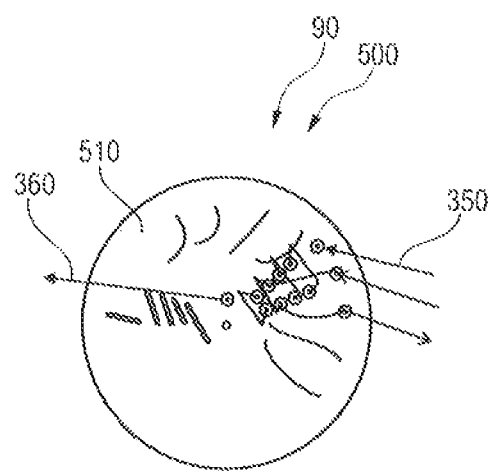
FIG. 5D illustrates the sampling unit of FIG. 5A in the second (dispatch) position in which another sample loop is individually accessible.
Figure 5E:
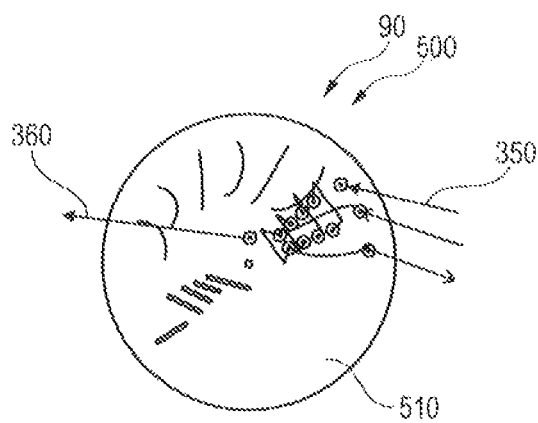
FIG. 5E illustrates the sampling unit of FIG. 5A in the second (dispatch) position in which another sample loop is individually accessible.

FIGS. 5C-5E illustrate the respective coupling and connection schemes when rotating the rotor element 510 further anticlockwise in order to couple sample loop 330B between the second input line 385 and the second output line 390 in FIG. 5C, in order to couple sample loop 330C between the second input line 385 and the second output line 390 in FIG. 5D, and in order to couple sample loop 330D between the second input line 385 and the second output line 390 in FIG. 5E. Accordingly, by respectively rotating the rotor element 510, each of the sample loops 330A-330D can be addressed individually and coupled between the second input line 385 and the second output line 390.

Operation of the second sampling unit 90 of FIGS. 5A-5E is substantially the same as aforedescribed with respect to FIGS. 4A-4D and FIGS. 3A-3D which also applies, mutatis mutandis, here. Starting from the first position (or fill position) in FIG. 5A, a sample fluid is introduced via the first input line 350 and flows successively through the sample loops 330A-330D, given a continuous flow of the sample fluid. Any fluid present in the sample loops 330A-330D before the introduction of the sample fluid will be pushed out via the first output line 360 e.g. into waste. That means that after a while of introducing the sample fluid via the first input line 350, each of the sample loops 330A-330D is filled with the sample fluid. Accordingly, the sample container 340 can receive and store the sample fluid (via the first input line 350). Dependent on the homogeneity (or better to say the non-homogeneity) of the sample fluid along the length of the sample container 340, each of the sample loops 330A-330D will comprise an individual sample package of the fluidic sample as contained in a respective volume segment of the respective sample loop.

When switching the rotor element 510 from the first position (as depicted in FIG. 5A) into the second positions (as depicted in the FIGS. 5B-5E), the sample loops 330A-330D become physically and thus fluidically separated from each other, so that each of the sample loops 330A-330D contains an individual sample package of the fluidic sample. Further, the first input line 350 is now separated from the sample loops 330A-330D and may be directly coupled to the first output line 360 (e.g. via connections not shown in the figures), so that any flow of introduced via the first input line 350 will not pass the sample loops 330A-330D but go to the first output line 360 (e.g. into waste).

By further rotating the rotor element 510, each of the sample loops 330A-330D can be individually coupled between the second input line 385 and the second output line 390 and thus accessed (or, in other words, "read out" individually).

Similar to the embodiment of FIG. 4, the respective grooves 370 in FIG. 5 are displaced radially with respect to each other, so that the content of such grooves 370 will not "be transported" to another sample loop 330 when switching between the sample loops unit 330, thus allowing to avoid or at least reduce sample contamination of unwanted modifications in the order of compounds within the sample fluid.

In both embodiments of FIGS. 4 and 5, the rotor elements 410 and 510 and the stator are configured to provide a rotational movement with respect to each other. In the shown embodiments, the second sampling unit 90 comprises a plurality of sample loops, i.e. three sample loops 330A-330C in the embodiment of FIG. 4 and four sample loops 330A-330D in the embodiment of FIG. 5. It is clear, however, that any number of sample loops may be applied dependent on the requirements of the specific application and in particular on the number of sample segmentations to be provided as will be illustrated later.

FIGS. 6A-6B and FIGS. 7A-7B illustrate embodiments according to another aspect of the present invention in a so-called "Feed Injection Mode". Both embodiments are shown in principle schematics only. More detailed embodiments suitable for the present invention are described e.g. in WO2014085003A2 and EP3252464A1, both by the same applicant, which disclosure with respect to such Feed Injection shall be incorporated herein by reference.

Figure 6A:
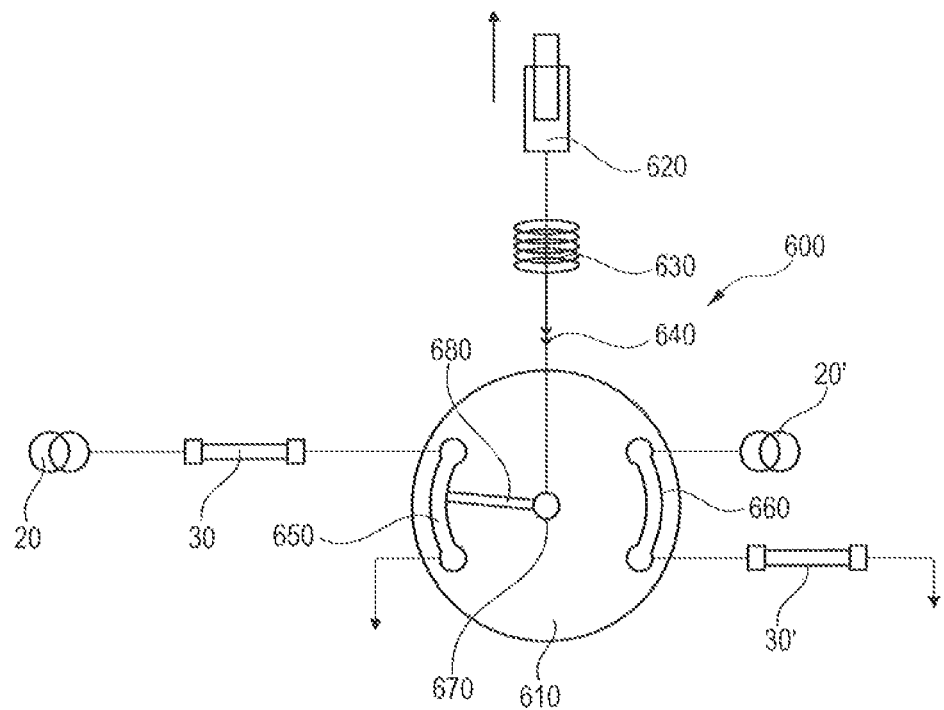
FIG. 6A illustrates an example of a liquid separation system in a so-called "Feed Injection mode," with a switching unit thereof in a first position, according to an embodiment of the present disclosure.

In further detail, FIG. 6A depicts a two-dimensional chromatography system similar to FIG. 2 but in schematic representation only. The first dimension is represented by the pump 20 having the separation device 30 (e.g. a chromatographic column) coupled downstream thereof. The second dimension is represented by the (second) pump 20' having the (second) separation device 30' (e.g. a chromatographic column) coupled downstream thereof.

Coupled between the first dimension and the second dimension in the embodiment of FIG. 6A, is a sampling unit 600 comprising a switching unit 610, a metering device 620, and a sample container 630 (which similar to the embodiments of FIGS. 3-5 may preferably be a sample loop, a trapping column, or the like). An optional seat 640 may be used to allow physically decoupling the flow path of the metering device 620 together with the sample container 630.

The switching unit 610 may be embodied as a valve, such as a rotational valve schematically depicted in FIG. 6. However, it goes without saying that any other valve, such as a linear valve, or other type of switching unit may be used accordingly.

Figure 6B:
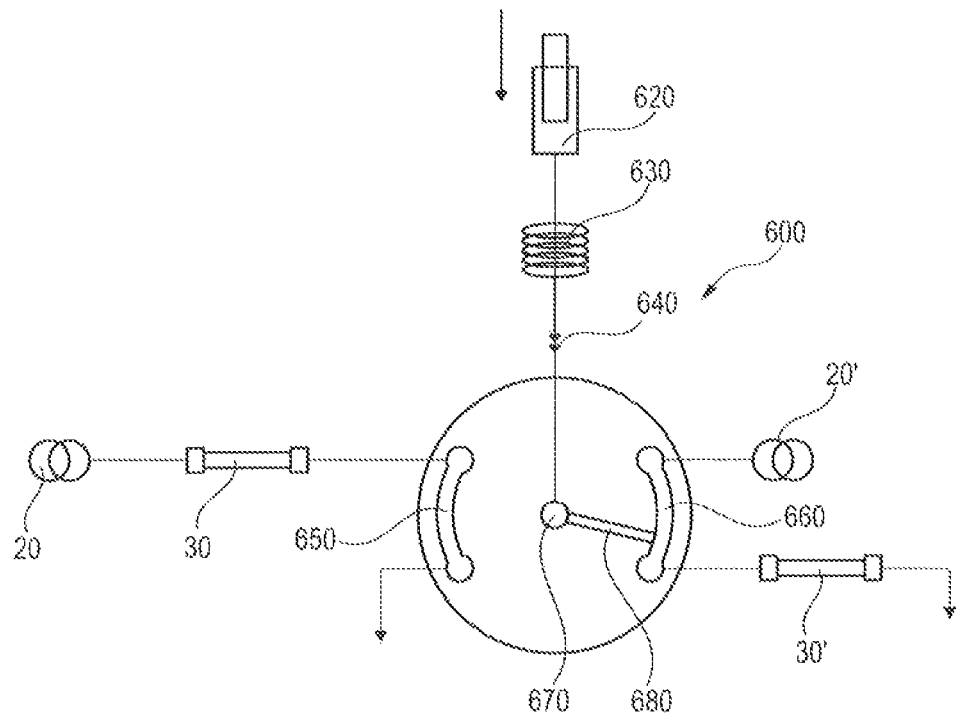
FIG. 6B illustrates the liquid separation system of FIG. 6A with the switching unit in another switching position.

In the embodiment of FIGS. 6A-6B, the switching unit 610 comprises a stator element having a first groove 650, a second groove 660, and a port 670. A rotor element of the switching unit 610 comprises a groove 680 coupled on one end to the port 670. The other end of the groove 680 can be coupled (by rotational movement between rotor and stator elements) either to the first groove 650 or the second groove 660.

As explained already above, the assignment of elements as being "rotor" or "stator" is basically arbitrary and exchangeable. Typically and for the sake of technical simplicity in rotational valves, the stator element bears other components coupling (from external to the rotational valve) to the rotational valve, such as capillaries, fittings, et cetera, while the rotor element is either free of or only bears a minimum of such external components.

In operation and when the switching unit 610 is in the position of FIG. 6A, the groove 680 coupled to the first groove 650, which again is fluidically coupled to separation device 30 with the other end of the first groove 650 may be coupled to waste. The metering device 620 together with the sample container 630 are in this position of FIG. 6A fluidically coupled to the output of the separation device 30 (as flowing through the first groove 650), allowing the metering device 620 (e.g. by movement in the direction of the arrow in FIG. 6A) to draw fluid from the first groove 650 via the groove 680 into the sample container 630. Accordingly, a sample fluid pre-fractionated by the separation device 30 can be drawn into the sample container 630. It is clear that, in particular dependent on the movement of the metering device 620, either the entire fluid flow in the first groove 650 or only a part thereof can be drawn into the sample container 630.

As result of the "sample draw in" operation as depicted in FIG. 6A, the sample container 630 can contain a pre-fractionated sample fluid, i.e. comprising a plurality of different compounds, as separated by the separating device 30, with each compound having a respective spatial concentration distribution along the length of the sample container 630. The pre-fractionated sample fluid within the sample container 630 will be in "reverse order" with respect to the elution from the separation device 30, i.e. such compounds having been eluted first from the separation device 30 will be spatially contained within the sample container 630 towards the metering device 620, while such compounds having been eluted last from the separating device 30 will be spatially contained at opposite end within the sample container 630 towards the port 670.

When rotating the switching unit 610 from the position of FIG. 6A to the position of FIG. 6B, the flow path between the metering device 620 and the port 670 is now coupled via the groove 680 to the second groove 660 which in turn is coupled between high pressure flow path of the second dimension provided between the pump 20' and the separation device 30'. In this position, e.g. by movement of the metering device 620 into the direction as indicated by the arrow in FIG. 6B, the metering device 620 can now push the content of the flow path between the metering device 620 and the port 670 into the second groove 660 and thus into the second dimension flow path between the pump 20' and the separation device 30', so that such pushed in content may e.g. be (further) separated by the separating device 30'. The volume of the flow path between the metering device 620 and the port 670 is typically designed to be essentially dominated and defined by the volume of the sample container 630, i.e. the volume of the sample container 630 is typically designed to be much larger, e.g. by the order of magnitude, than the remaining volume in such flow path.

In order to adjust between the different pressure levels e.g. in the first groove 650 (which may be close to ambient pressure) and the second groove 660 (which may be in the range of several hundred bar), a pre-pressurization of the sample container 630 can be provided such as by means of the metering device 620 e.g. by piston movement of the metering device 620 in the direction of the arrow in FIG. 6B. Such pre-pressurization may be provided in a state of the valve 610 when the groove 680 is neither coupled to the first groove 650 nor to the second groove 660.

"Feed Injection" as known in the art, e.g. in the aforementioned WO2014085003A2 and EP3252464A1, is provided in "one shot", i.e. the (substantially entire) content of the sample container 630 is fed/injected towards the separation device 30' in one step or injection operation. After such injection operation, the sample container 630 in such prior art operations may be refilled for further injection operations.

According to embodiments of the present invention, rather than pushing out the entire content of the sample container 630 towards the separation device 30', the sampling unit 600 is configured for sequentially dispatching (e.g. pushing out towards the separation device 30') individual sample packages contained along the length of the sample container 630. In an example, the metering device 20 can be operated to first dispatch a first sample package towards the separation device 30', then a second sample package, a third sample package, and so forth, with the first sample package being (spatially) located within the sample container 630 closest towards the port 670, and with each successive sample package being located within the sample container 630 further towards the metering device 620.

In an embodiment, orientation of the sample container 630 between the metering device 620 and the port 670 can be inversed in order to arrange the content of the sample container 630 towards the separation device 30' in "correct order" (FIFO—first in first out), i.e. opposite to the "reverse order" (LIFO—last in first out), so that such compounds having been eluted first from the separation device 30 will be spatially contained within the sample container 630 towards the port 670, and such components having been eluted last from the separation device 30 will be spatially contained at opposite end within the sample container 630 towards the metering device 620.

It is clear that the stator grooves can be implemented as punctual openings at the junction points of the respective fluid lines rather than protruding channels. It is also clear that such sample dispatching valve can comprise connections to multiple first dimension and/or multiple second dimension systems, such that e.g. a sample drawn into the container 630 can be sequentially injected by portions into a plurality of the second dimension systems (20'-30'; 20''-30'' etc.)

In accordance with the aforesaid, operation of the sampling unit 600 including operation of the switching device 610 and the metering device 620 can be controlled by the control unit 70.

Figure 7A:
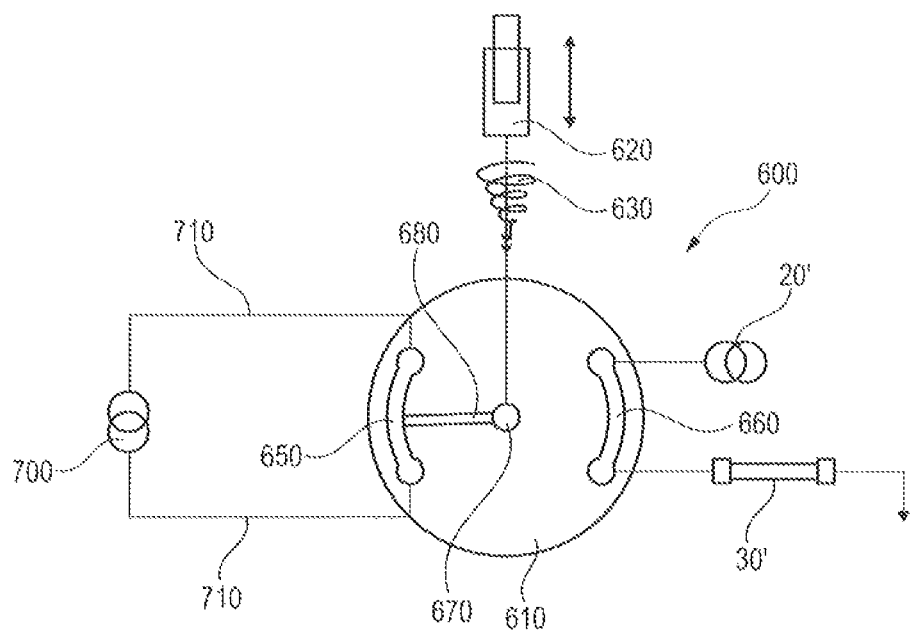
FIG. 7A illustrates an example of a liquid separation system in a "Feed Injection Mode," with a switching unit thereof in a first postion, according to another embodiment of the present disclosure.
Figure 7B:
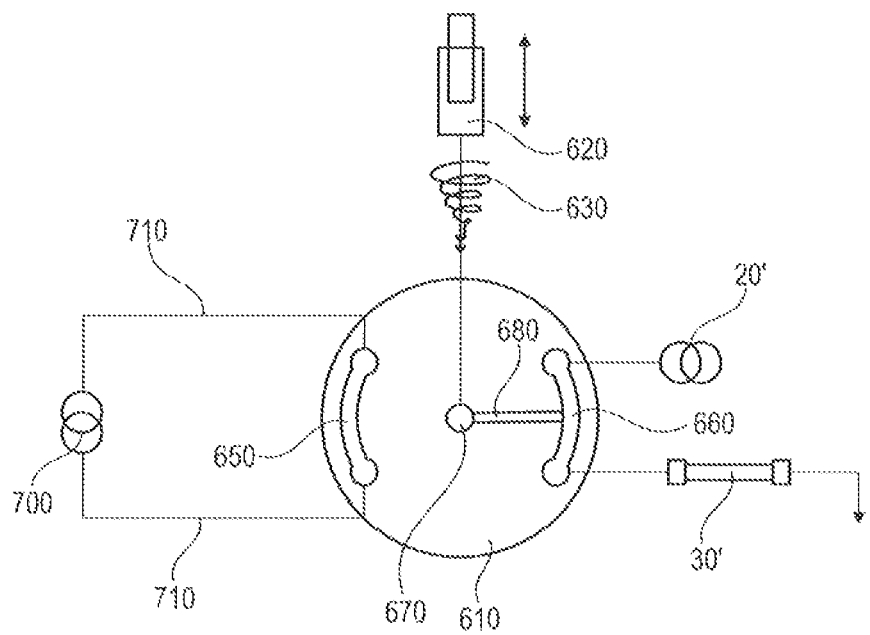
FIG. 7B illustrates the liquid separation system of FIG. 7A with the switching unit in another switching position.

FIGS. 7A-7B illustrate a further embodiment of the present invention employed e.g. for process control. Instead of the first dimension separation in the embodiment shown in FIG. 6, the sampling unit 600 in the embodiment of FIG. 7 is coupled (on the left hand side in representation of FIG. 7) to a "flow through" unit schematically represented in FIG. 7 by a driving unit 700 (e.g. a pump) and a flow path 710 wherein a fluid can be moved by the driving unit 700. Such flow through unit can be or further comprise, for example, a chemical or biological reactor for generating and/or modifying chemical and/or biological compounds, with the flow path 710 fluidically coupling to such reactor and fluidically transporting compounds from such reactor. The flow path 710 is provided to allow to withdraw sample fluid from such flow path 710 e.g. in order to further analyze such withdrawn sample fluid for example in the sense of a process control. Such withdraw process can be a singular process, for withdrawing sample fluid only once, or a regular process in the sense that sample fluid is regularly withdrawn e.g. in a defined temporal cycle (for example once per minute).

Operation of the embodiment in FIG. 7A-7B is substantially the same as illustrated above for FIGS. 6A-6B and only needs to briefly reiterated. In a position of FIG. 7A, the groove 680 is coupled to the first groove 650 so that the metering device 620 can withdraw sample fluid present in the first groove 650 when flowing in the flow path 710. The withdrawn sample fluid is stored in the sample container 630. By switching the valve 610 from the position of FIG. 6A into the position of FIG. 6B, the metering device 620 can dispatch individual sample packages contained in respective volume segments along the length of the sample container 630 towards the separation device 30' for further separation.

Instead of the separation provided and schematically represented by the flow path of the pump 20' and the separation device 30', it goes without saying that any other fluid processing unit as known in the art can be coupled to the sampling unit 600 in order to process the individual sample packages dispatched by the sampling unit 600.

Figure 8:
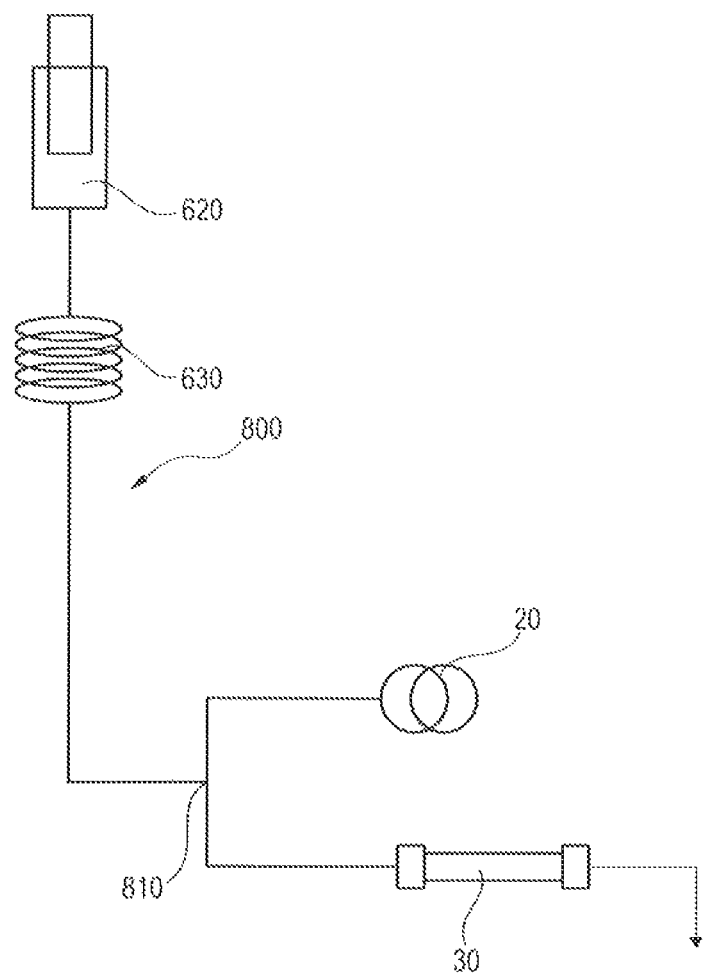
FIG. 8A illustrates an example of a liquid separation system in a "Feed Injection Mode," according to another embodiment of the present disclosure.

FIG. 8 illustrates in schematic representation a further embodiment also providing "Feed Injection" as illustrated for the above FIGS. 6 and 7. The embodiment of FIG. 8 shows a one-dimensional chromatography unit similar to the embodiment illustrated above with respect to FIG. 1, however, with the difference that the first sampling handling unit 40 is replaced by the sampling unit 800 for providing the "Feed Injection". The sample unit 800 also comprises the metering device 620, the sample container 630, and may comprise further components dependent on the specifics of the respective application. The sampling unit 800 can be coupled to the flow path between the pump 20 and the separation unit 30 by a simple T-connection, as schematically depicted in FIG. 8, in a coupling point 810 or by any other means known in the art such as a valve (e.g. rotational, linear, or check valves).

In operation and as already explained above, by controlling the pressure in the flow path between the metering device 620 and the coupling point 810, sample fluid contained in the sample container 630 can be dispatched and injected into the flow path between the pump 20 and the separation unit 30. Such pressurization may be provided by the metering device 620 alone but also other pumping units (not shown in the figures) may be employed alternatively or in addition.

In the above, it has been explained that already pre-fractionated sample fluid can be contained in the sample container 630, i.e. the sample fluid comprising a plurality of different compounds, each compound having a respective spatial concentration distribution along the length of the sample container e.g. resulting from a previous chromatographic separation process. Individual sample packages of such pre-fractionated sample fluid can then be dispatched for further processing.

In an embodiment, the sample fluid contained in the sample container 630 shall be assumed to be substantially homogeneous along the length of the sample container 630, so that it can be assumed that each individual sample package dispatched by the sampling unit 800 shall be substantially the same, i.e. containing substantially the same composition of fractions. This may also be the case e.g. in a process control arrangement of FIG. 7 when the composition of the fluid flow in the flow path 710 is substantially the same during the sample flow withdraw process.

In so-called "chromatogram averaging" or "multiplex HPLC", multiple portions of the same sample fluid are injected into a chromatography flow path for chromatographic separation. Later portions are injected while still a previous portion of the sample fluid is being separated, so that in other words multiple separation processes (however of the same sample fluid) occur at the same time however being temporarily offset or shifted against each other. By knowing the temporal relationship between the injection events, the resulting chromatogram can be post-processed and may result in higher resolution of the separated fractions. This is described in greater detail e.g. in "Development of a Straightforward and Robust Technique to Implement Hadamard Encoded Multiplexing to High-Performance Liquid Chromatography", by Alexander F. Siegle and Oliver Trapp, Anal. Chem. 2014, 86, 10828-10833; or "Using chromatogram averaging to improve quantitation of minor impurities", by Kerstin Zawatzky, Mingxiang Lin, Wes Schafer, Bing Mao, Oliver Trapp, Christopher J. Welch, Journal of Chromatography A, 1465 (2016) 205-210.

In the embodiment of FIG. 8 and following the aforedescribed "chromatogram averaging" or "multiplex HPLC", respective portions of the sample fluid contained in the sample container 630 are sequentially dispatched and injected at the coupling point 810, and will be separated by the separation unit 30. Thus, by using the principle of "Feed Injection" sample dispatching can be provided much simpler and in particular avoiding pressure artifacts resulting from switching one or more sample loops in and out of the high pressure path between the pump 20 and the separation unit 30.

Generally speaking and irrespective of the specific embodiment, when applying the principle of "Feed Injection", i.e. feeding a sample-containing flow into a high-pressure separation path by combining both flows, e.g. as depicted in FIG. 8, care has to be taken when applying a solvent gradient (i.e. a variation of the solvent mixture over time) in the high-pressure separation path so that the gradient does not start before the sample has been "injected" into the separation path. This may otherwise lead to uncontrolled starting conditions for the sample separation due to the change in solvent mixture over time during the gradient.

In the embodiment of FIG. 8, when the pump 20 is configured for providing a gradient in solvent composition over time towards the separation unit 30, the sampling unit 800 as well as the pump 20 needs to be controlled, so that the pump 20 will provide a "substantially" constant solvent mixture (which may even be a single solvent only, e.g. 100% solvent A and 0% solvent B) until the metering device 620 has fully "injected" all sample of the sample container 630 to be injected via the coupling point 810 into the high pressure flow path between the pump 20 and the separation unit 30. Once the sample to be injected has passed the coupling point 810 towards the separation unit 30, the pump 20 can then be operated into the gradient mode to generate the intended solvent mixture over time towards the separation unit 30.

It should be noted that the term "comprising" does not exclude other elements, and that the term "a" or "an" do not exclude a plurality. Also, elements, which are described in connection with different embodiment examples, can be combined. It should also be noted that reference numerals in the claims should not be constructed as limiting the scope of protection of the claims.

The invention claimed is:

1. A sampling unit for handling a sample fluid, the sampling unit comprising:
   a sample container comprising an inlet, an outlet, and a length between the inlet and the outlet, wherein the sample container is configured to receive and store the sample fluid, and wherein a composition of the sample fluid is not homogeneous over the length of the sample container; and
   a sample segment dispatching unit comprising a plurality of sample loops along the length of the sample container, the sample segment dispatching unit configured to provide a plurality of individual sample packages of the sample fluid, the individual sample packages respectively contained in the sample loops, and to individually dispatch each individual sample package from the respective sample loop in which the individual sample package is contained, separately from the other individual sample packages of the plurality of individual sample packages contained in the other respective sample loops, for further processing in a fluid processing unit.

2. The sampling unit of claim 1, comprising at least one of:
   the sample fluid comprises a plurality of different compounds;
   the sample fluid comprises a plurality of different compounds having different distributions of concentration over the length of the sample container;
   the sample fluid comprises a plurality of different compounds, each compound having a respective spatial concentration distribution along the length of the sample container resulting from a previous sample processing selected from the group consisting of: a chromatographic separation, a flow reaction, a chemical reaction, a fermentation, and a sample withdrawal from a process fluid;
   the sample fluid comprises a plurality of different compounds being pre-fractionated by a previous chromatographic separation process.

3. The sampling unit of claim 1,
   wherein the sample segment dispatching unit is configured to physically separate the sample loops to individually access each of the sample loops, and to dispatch at least a portion of the individual sample package, contained in a respective sample loop accessed by the sample segment dispatching unit, for further processing in the fluid processing unit.

4. The sampling unit of claim 3, wherein:
the sample segment dispatching unit comprises a valve to which the sample loops are connected, wherein the valve is configured to have a first position for serially coupling the sample loops to provide the sample container, and a plurality of second positions for decoupling and fluidically separating the sample loops from each other, each second position providing access to a respective one of the sample loops, so that two or more of the fluidically separated sample loops are accessed individually.

5. The sampling unit of the claim 4, comprising at least one of:
wherein in the first position, the valve is configured for serially coupling the plurality of sample loops to provide the sample container in that an input of a first sample loop of the plurality of sample loops provides an input of the sample container, an input of a successive sample loop of the plurality of sample loops is coupled to an output of previous sample loop of the plurality of sample loops, and an output of a last sample loop of the plurality of sample loops provides an output of the sample container, with the length of the sample loop being provided between the input at the output of the sample container.

6. The sampling unit of claim 4, wherein the valve comprises a stator, a first rotor configured to provide a rotational movement with respect to the stator, a first input port for receiving the sample fluid, a second input port for receiving a flow of a mobile phase, a second output port for outputting the flow of the mobile phase, a plurality of first couplers for—in the first position—serially coupling the plurality of sample loops with each other and with the first input port, and a plurality of second couplers for coupling between the second input port and the second output port for allowing the flow of the mobile phase between the second input port and the second output port.

7. The sampling unit of claim 1, wherein the sample segment dispatching unit is configured to pressurize the sample container and to sequentially push out of the sample container each individual sample package contained in the respective sample loop.

8. The sampling unit of claim 7, further comprising:
a fluidic junction with a mobile phase flow path providing a flow of a mobile phase at a mobile phase pressure, wherein the fluidic junction is in fluidic communication with a chromatographic column for separating compounds of the sample fluid and with the sample segment dispatching unit; and
wherein the sample segment dispatching unit is configured to pressurize the sample container to a pressure matching the mobile phase pressure, and to sequentially push out each individual sample package contained in the respective sample loop from the sample container into the mobile phase flow path via the fluidic junction.

9. An injector configured for introducing a sample fluid into a mobile phase in a fluid processing unit, the injector comprising:
the sampling unit of claim 1 configured to individually inject each of the individual sample packages into the mobile phase for further processing in the fluid processing unit.

10. A fluid processing unit for processing a sample fluid, the fluid processing unit comprising:
the sampling unit of claim 1,
wherein the fluid processing unit comprises at least one of:
a chromatography unit for chromatographically separating compounds in the sample packages;
a two-dimensional chromatography unit for chromatographically separating a fluidic sample in a first chromatography dimension and providing the separated fluidic sample as the sample fluid to the sampling unit for injecting the sample packages into a second chromatography unit for further separating the injected sample packages;
a liquid chromatography unit for chromatographically separating liquid compounds in the sample packages;
a two-dimensional liquid chromatography unit for chromatographically separating a liquid sample in a first chromatography dimension and providing the separated liquid sample as the sample fluid to the sampling unit for injecting the sample packages into a second chromatography unit for further separating the injected sample packages;
a fractionating unit for fractionating compounds of the sample packages;
an analyzing unit for analyzing the sample packages;
a mass spectrometer unit comprising a mass spectrometer.

11. A fluid separation system for separating compounds of a sample fluid in a mobile phase, the fluid separation system comprising:
a mobile phase drive configured to drive the mobile phase through the fluid separation system;
the sampling unit of claim 1, configured to introduce the sample fluid into the mobile phase; and
a separation unit configured to separate compounds of the sample fluid in the mobile phase.

12. The separation system of claim 11, further comprising at least one of:
a detector configured to detect separated compounds of the sample fluid;
a collection unit configured to collect separated compounds of the sample fluid;
a data processing unit configured to process data received from the fluid separation system;
a degassing apparatus configured to degas the mobile phase.

13. A two-dimensional fluid separation system for separating compounds of a fluidic sample, the two-dimensional fluid separation system comprising:
a first fluid separation system for chromatographically separating compounds of the fluidic sample;
a second fluid separation system for further chromatographically separating the separated compounds of the fluidic sample; and
the sampling unit of claim 1, configured to receive the separated fluidic sample from the first fluid separation system as the sample fluid and to inject the sample packages into the second fluid separation system for further separating the injected sample packages.

14. The sampling unit of claim 1, wherein the valve comprises a stator, a first rotor configured for providing a rotational movement with respect to the stator, a first input port for receiving the sample fluid or a flow of a mobile phase, a first output port for outputting the content of the container or the content of the respectively connected sample loop.

15. The sampling unit of claim 1, wherein the sample segment dispatching unit is configured to individually dispatch at least two of the individual sample packages from the repective sample loops sequentially.

16. A method of handling a sample fluid, the method comprising:
- receiving and storing the sample fluid in a sample container comprising an inlet, an outlet, and a length between the inlet and the outlet, wherein a composition of the sample fluid is not homogeneous over the length of the sample container;
- providing a plurality of individual sample packages of the sample fluid, the individual sample packages respectively contained in a plurality of sample loops along the length of the sample container; and
- individually dispatching each individual sample package from the respective sample loop in which the individual sample package is contained, separately from the other individual sample packages of the plurality of individual sample packages contained in the other respective sample loops, for further processing in a fluid processing unit.

17. A non-transitory computer-readable medium, comprising instructions stored thereon, that when executed on a processor, perform the steps of the method of claim 16.

18. The method of claim 16, comprising individually dispatching at least two of the individual sample packages from the respective sample loops sequentially.

* * * * *